US011955736B2

(12) United States Patent
Yoshikawa et al.

(10) Patent No.: US 11,955,736 B2
(45) Date of Patent: Apr. 9, 2024

(54) ANTENNA, WIRELESS COMMUNICATION MODULE, AND WIRELESS COMMUNICATION DEVICE

(71) Applicant: KYOCERA CORPORATION, Kyoto (JP)

(72) Inventors: Hiromichi Yoshikawa, Yokohama (JP); Nobuki Hiramatsu, Yokohama (JP); Masamichi Yonehara, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 297 days.

(21) Appl. No.: 17/621,238

(22) PCT Filed: Jun. 23, 2020

(86) PCT No.: PCT/JP2020/024626
§ 371 (c)(1),
(2) Date: Dec. 21, 2021

(87) PCT Pub. No.: WO2020/262384
PCT Pub. Date: Dec. 30, 2020

(65) Prior Publication Data
US 2022/0359988 A1 Nov. 10, 2022

(30) Foreign Application Priority Data
Jun. 25, 2019 (JP) ................................ 2019-117743

(51) Int. Cl.
*H01Q 9/04* (2006.01)
*H01Q 1/24* (2006.01)
(Continued)

(52) U.S. Cl.
CPC ............. *H01Q 9/0471* (2013.01); *H01Q 1/24* (2013.01); *H01Q 1/243* (2013.01); *H01Q 1/36* (2013.01);
(Continued)

(58) Field of Classification Search
CPC ........ H01Q 9/0471; H01Q 9/04; H01Q 1/243; H01Q 1/24; H01Q 1/38; H01Q 1/36; H01Q 1/42; H01Q 15/006
(Continued)

(56) References Cited

U.S. PATENT DOCUMENTS

2019/0326678 A1* 10/2019 Uchimura ............ H01Q 9/0414
2020/0014113 A1* 1/2020 Asaka .................. H01Q 9/0414
(Continued)

FOREIGN PATENT DOCUMENTS

JP WO2018174026 A1 4/2019

OTHER PUBLICATIONS

Yasutaka Murakami et al., "Low-Profile Design and Bandwidth Characteristics of Artificial Magnetic Conductor with Dielectric Substrate", 2015, pp. 172-179, vol. J98-B No. 2, IEEE, Japan, 9pp.
(Continued)

*Primary Examiner* — Hai V Tran
(74) *Attorney, Agent, or Firm* — HAUPTMAN HAM, LLP

(57) ABSTRACT

An antenna includes a housing, a first conductor group, and a power supply line. The housing includes a first surface including at least three first corner portions, a second surface including at least three second corner portions and facing the first surface, and a side surface connecting the first and second surfaces. A housing portion is surrounded by the first, second and side surfaces. The first conductor group includes a first conductor extending along the first surface, at least three second conductors separated from one another, and a second conductor group. The second conductors extend along the side surface from the first corner portions to the second corner portions and are electrically connected to the first conductor. The second conductor group extends along the second surface and capacitively couples the at least three
(Continued)

second conductors. The power supply line is connected to any one portion of the second conductor group.

9 Claims, 13 Drawing Sheets

(51) Int. Cl.
*H01Q 1/36* (2006.01)
*H01Q 1/42* (2006.01)
*H01Q 15/00* (2006.01)

(52) U.S. Cl.
CPC ................. *H01Q 1/42* (2013.01); *H01Q 9/04* (2013.01); *H01Q 15/006* (2013.01)

(58) Field of Classification Search
USPC .......................................................... 343/702
See application file for complete search history.

(56) References Cited

U.S. PATENT DOCUMENTS

2020/0044351 A1 2/2020 Uchimura et al.
2021/0376489 A1* 12/2021 Hiramatsu ........... H01Q 9/0421

OTHER PUBLICATIONS

Yasutaka Murakami et al., "Optimum Configuration of Reflector for Dipole Antenna with AMC Reflector", 2015, pp. 1212-1220, vol. 98-B No. 11, IEEE, 10pp.

* cited by examiner

ANTENNA, WIRELESS COMMUNICATION MODULE, AND WIRELESS COMMUNICATION DEVICE

RELATED APPLICATIONS

The present application is a National Phase of International Application No. PCT/JP2020/024626 filed Jun. 23, 2020, which claims priority to Japanese Application No. 2019-117743, filed Jun. 25, 2019.

TECHNICAL FIELD

The present disclosure relates to an antenna, a wireless communication module, and a wireless communication device.

BACKGROUND ART

Electromagnetic waves emitted from an antenna are reflected by a metal conductor. A 180-degree phase shift occurs in the electromagnetic waves reflected by the metal conductor. The reflected electromagnetic waves combine with the electromagnetic waves emitted from the antenna. The amplitude may decrease as a result of the electromagnetic waves emitted from the antenna combining with the phase-shifted electromagnetic waves. As a result, the amplitude of the electromagnetic waves emitted from the antenna decreases.

The effect of the reflected waves is reduced by the distance between the antenna and the metal conductor being set to ¼ of the wavelength λ of the emitted electromagnetic waves.

To address this, a technique for reducing the effect of reflected waves using an artificial magnetic wall has been proposed. This technology is described, for example, in Non-Patent Literature (NPL) 1 and 2.

CITATION LIST

Non-Patent Literature

NPL 1: Murakami et al., "Low-Profile Design and Bandwidth Characteristics of Artificial Magnetic Conductor with Dielectric Substrate", IEICE Transactions on Communications (B), Vol. J98-B No. 2, pp. 172-179

NPL 2: Murakami et al., "Optimum Configuration of Reflector for Dipole Antenna with AMC Reflector", IEICE Transactions on Communications (B), Vol. J98-B No. 11, pp. 1212-1220

SUMMARY OF INVENTION

Technical Problem

However, the techniques described in NPL 1 and 2 require a large number of resonator structures to be aligned.

The present disclosure is directed at providing a novel antenna, wireless communication module, and wireless communication device.

Solution to Problem

An antenna according to an embodiment of the present disclosure includes: a housing made of a resin; a first conductor group; and a power supply line, wherein the housing includes a first surface including at least three first corner portions, a second surface including at least three second corner portions, the second surface facing the first surface, a side surface connecting the first surface and the second surface, and a housing portion surrounded by the first surface, the second surface, and the side surface, the first conductor group includes a first conductor extending along the first surface, at least three second conductors separated from one another extending along the side surface from the first corner portions toward the second corner portions, the at least three second conductors being electrically connected to the first conductor, and a second conductor group extending along the second surface, the second conductor group capacitively coupling the at least three second conductors, and the power supply line is connected to any one portion of the second conductor group.

A wireless communication module according to an embodiment of the present disclosure includes: the antenna described above; and a radio frequency (RF) module located within the housing portion.

A wireless communication device according to an embodiment of the present disclosure includes: the wireless communication module described above; and a sensor located within the housing portion.

Advantageous Effects of Invention

According to an embodiment of the present disclosure, a novel antenna, wireless communication module, and wireless communication device can be provided.

DESCRIPTION OF EMBODIMENTS

Figure 1:
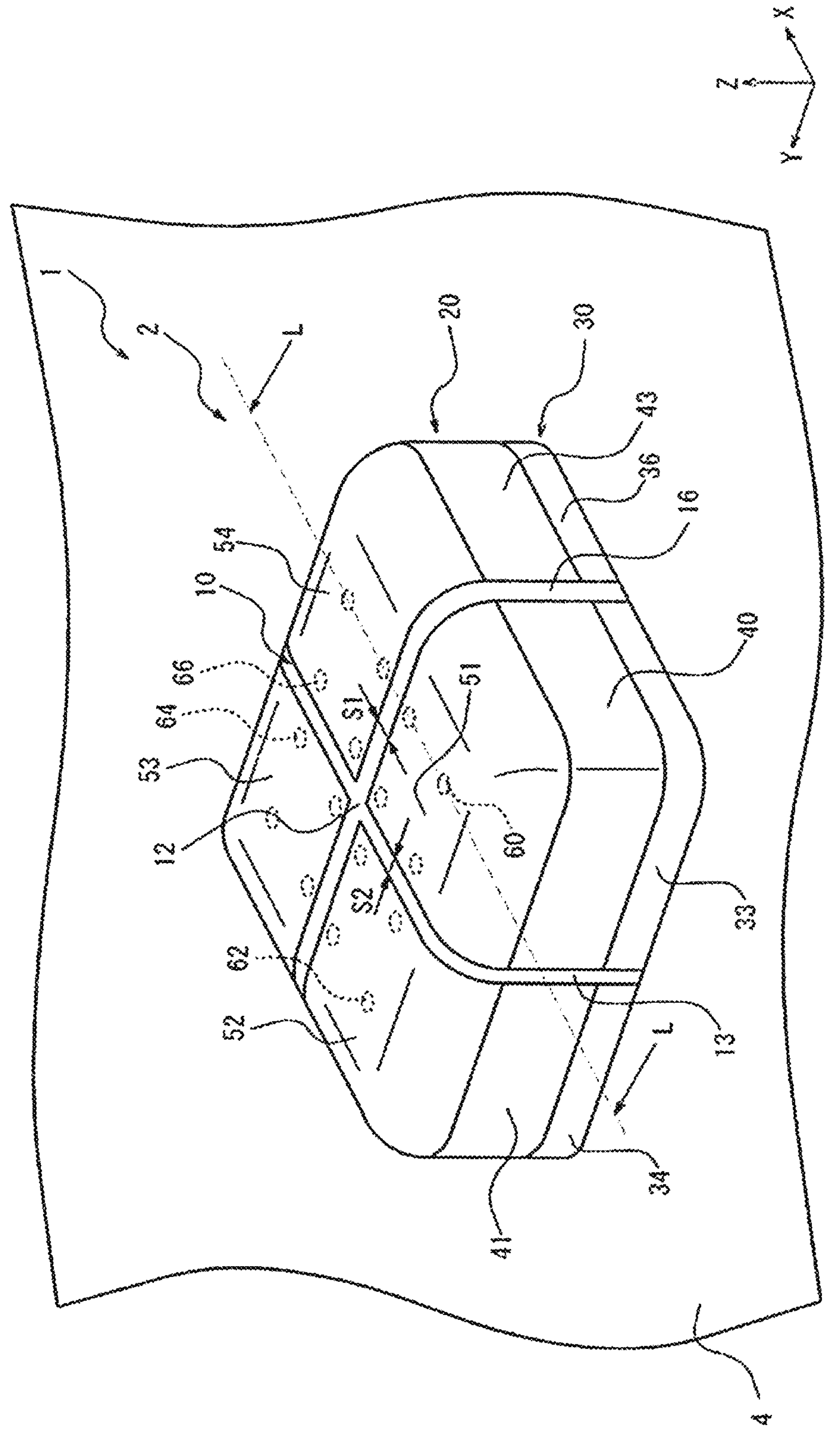
FIG. 1 is a perspective view of a wireless communication device according to a first embodiment of the present disclosure.

In the present disclosure, each requirement is configured to perform an executable operation. Thus, in the present disclosure, the operation executed by a requirement may mean that the requirement is configured to be able to execute the operation. In the present disclosure, a case where a requirement executes an operation may be paraphrased as the requirement is configured to be able to execute the operation. In the present disclosure, the operation able to be executed by the requirement may be paraphrased as the operation is able to be executed by a requirement provided or included in the requirement. In the present disclosure, in a case where one requirement causes another requirement to execute an operation, it may mean that the one requirement is configured to be able to cause the other requirement to execute the operation. In the present disclosure, a case where one requirement causes another requirement to execute an operation may be paraphrased as the one requirement is configured to control the other requirement so that the other requirement is caused to execute the operation. In the present disclosure, an operation executed by a requirement that is not described in the claims may be understood as being a non-essential operation.

In the present disclosure, each requirement has a functional enabled state. Thus, the functional state of a requirement may mean that the requirement is configured to be functional. In the present disclosure, a case where each requirement has a functional enabled state may be paraphrased as the requirement is configured to be in a functional state.

In the present disclosure, "dielectric material" may include a composition of either a ceramic material or a resin material. Examples of the ceramic material include an aluminum oxide sintered body, an aluminum nitride sintered body, a mullite sintered body, a glass ceramic sintered body, crystallized glass yielded by precipitation of a crystal component in a glass base material, and a microcrystalline sintered body such as mica or aluminum titanate. Examples of the resin material include an epoxy resin, a polyester resin, a polyimide resin, a polyamide-imide resin, a polyetherimide resin, and resin materials yielded by curing an uncured liquid crystal polymer or the like.

The "electrically conductive material" in the present disclosure may include a composition of any of a metal material, an alloy of metal materials, a cured metal paste, and a conductive polymer. Examples of the metal material include copper, silver, palladium, gold, platinum, aluminum, chrome, nickel, cadmium lead, selenium, manganese, tin, vanadium, lithium, cobalt, and titanium. The alloy includes a plurality of metallic materials. The metal paste includes the result of kneading a powder of a metal material with an organic solvent and a binder. Examples of the binder include an epoxy resin, a polyester resin, a polyimide resin, a polyamide-imide resin, and a polyetherimide resin. Examples of the conductive polymer include a polythiophene polymer, a polyacetylene polymer, a polyaniline polymer, and a polypyrrole polymer.

Embodiments of the present disclosure will be described below with reference to the drawings. In the following drawings, a Cartesian coordinate system of an X-axis, a Y-axis, and a Z-axis is used. Hereinafter, in cases where the positive direction of the X-axis and the negative direction of the X-axis are not particularly distinguished, the positive direction of the X-axis and the negative direction of the X-axis are collectively referred to as the "X direction". In cases where the positive direction of the Y-axis and the negative direction of the Y-axis are not particularly distinguished, the positive direction of the Y-axis and the negative direction of the Y-axis are collectively referred to as the "Y direction". In cases where the positive direction of the Z-axis and the negative direction of the Z-axis are not particularly distinguished, the positive direction of the Z-axis and the negative direction of the Z-axis are collectively referred to as the "Z direction".

Hereinafter, a first direction represents the X direction. A second direction represents the Y direction. A third direction represents the Z direction. However, the first direction and the second direction need not be orthogonal. The first direction and the second direction only need to intersect. Furthermore, the third direction does not need to be orthogonal to the first direction and the second direction. The third direction only needs to intersect the first direction and the second direction.

First Embodiment

Figure 2:
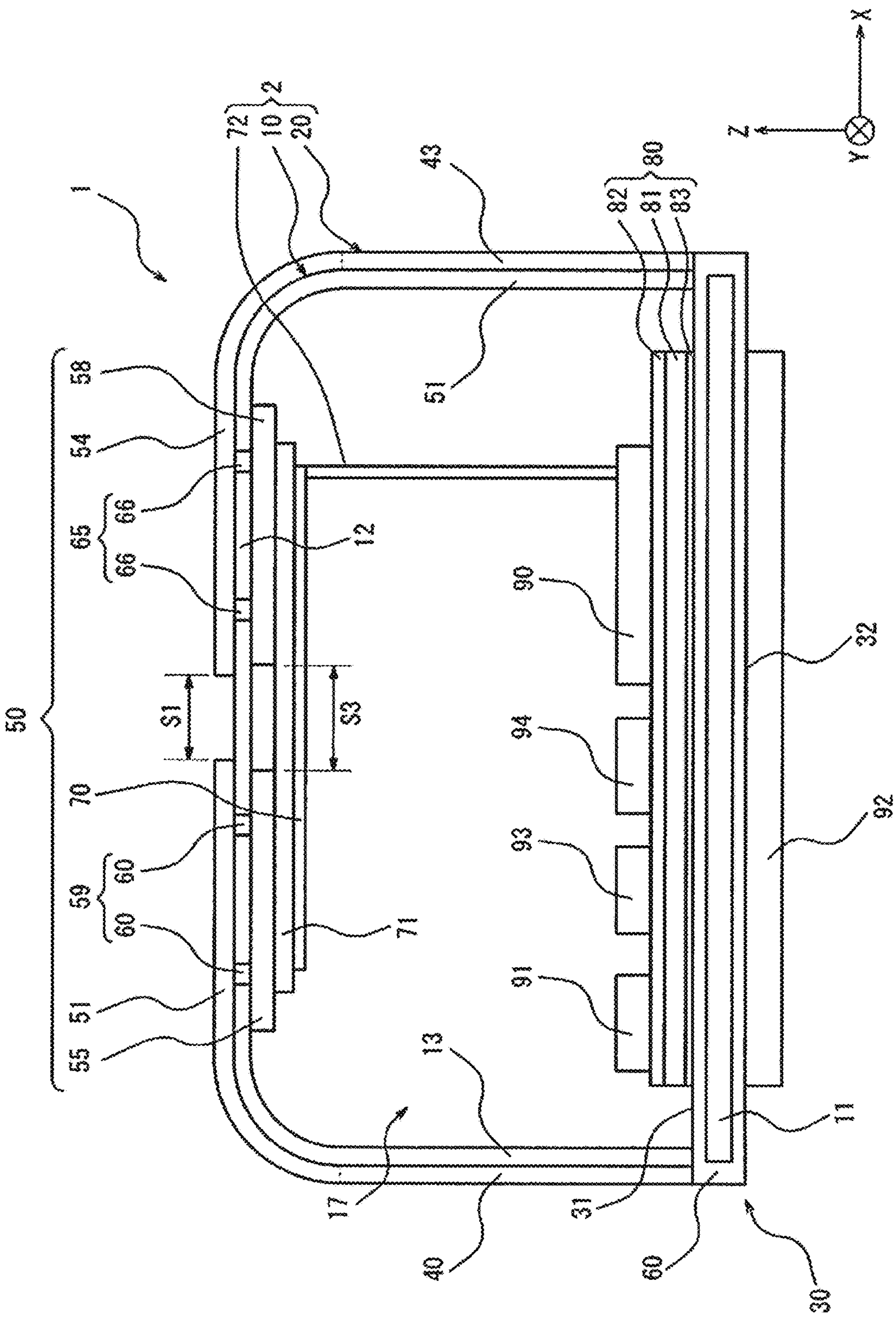
FIG. 2 is a cross-sectional view of the wireless communication device taken along L-L illustrated in FIG. 1.

As illustrated in FIG. 1, a wireless communication device 1 is roughly a square prism. The wireless communication device 1 includes two surfaces that are substantially parallel to the XY plane. The two surfaces are roughly square. The wireless communication device 1 includes an antenna 2. As illustrated in FIG. 2, the wireless communication device 1 may include a circuit board 80.

An antenna 2 is capable of emitting circularly polarized waves. As described below, the antenna 2 exhibits an artificial magnetic conductor character with respect to a predetermined frequency of electromagnetic waves incident on the XY plane included in the wireless communication device 1 from the positive Z-axis side. In the present disclosure, "artificial magnetic conductor character" means a characteristic of a surface where the phase difference between incident waves and reflected waves becomes 0 degrees. On the surface having the artificial magnetic conductor character, the phase difference between the incident waves and reflected waves in the frequency band ranges from −90 degrees to +90 degrees. By the antenna 2 exhibiting such an artificial magnetic conductor character, the emission efficiency of the antenna 2 can be maintained even when a metal plate 4 is positioned on the negative Z-axis side of the wireless communication device 1, as illustrated in FIG. 1.

As illustrated in FIG. 2, the antenna 2 includes a housing 10, a first conductor group 20, and a power supply line 72. The antenna 2 is configured with the housing 10 of the wireless communication device 1. The antenna 2 may include a dielectric substrate 71.

Figure 3:
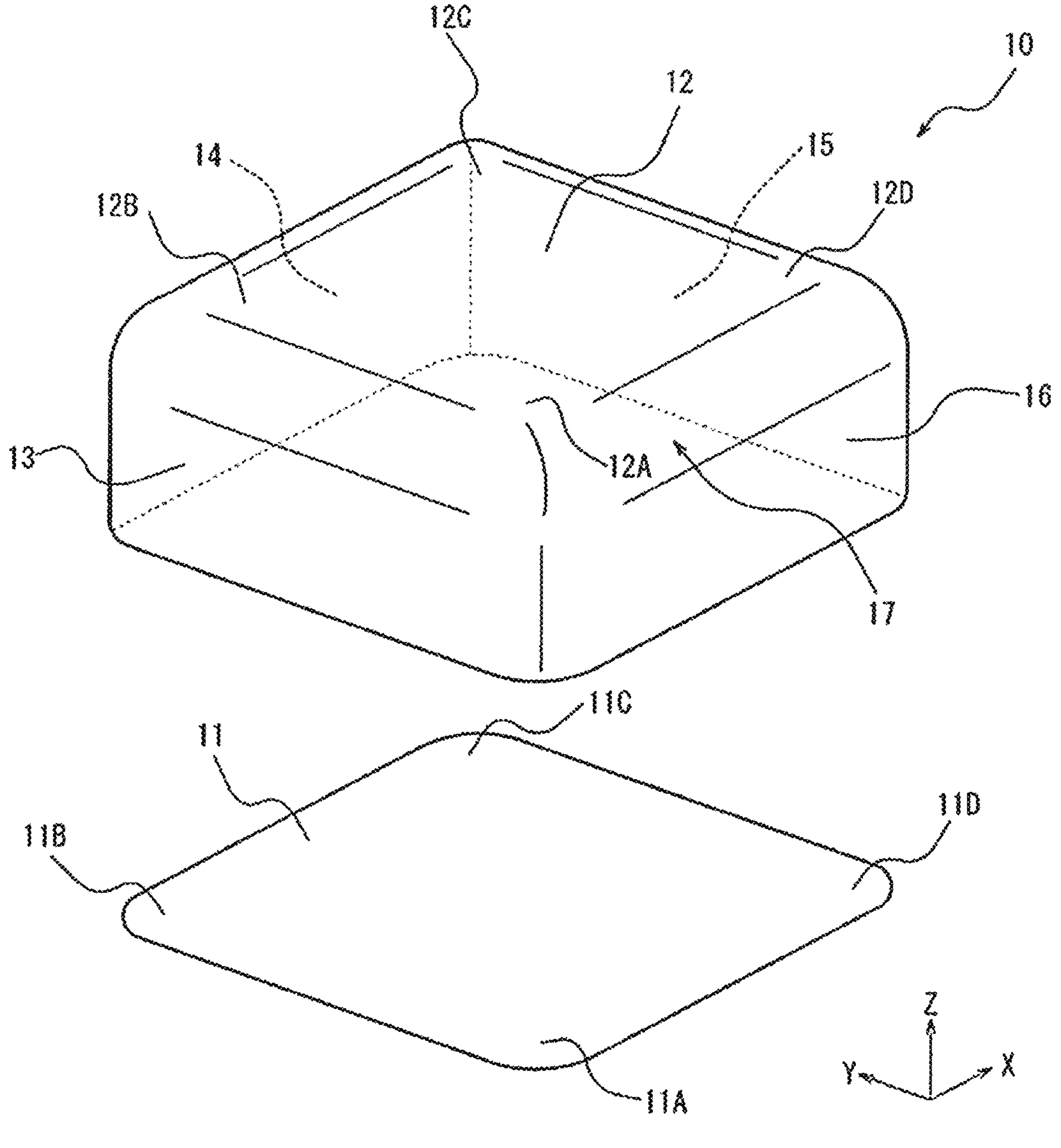
FIG. 3 is an exploded perspective view of a portion of a housing illustrated in FIG. 1.

Various components of the wireless communication device 1 are housed in the housing 10. The housing 10 is made of a resin. That is, the housing 10 includes a dielectric material. As illustrated in FIG. 3, the housing 10 is roughly a square prism. The corner portions of the housing 10, which is roughly a square prism, may have a rounded shape. However, the corner portions of the housing 10, which is roughly a square prism, may have an angular shape. The housing 10 includes a first surface 11, a second surface 12, and side surfaces 13, 14, 15, 16. As illustrated in FIG. 2, the housing 10 includes a housing portion 17.

As illustrated in FIG. 3, the first surface 11 and the second surface 12 face one another in the Z direction. The first surface 11 includes first corner portions 11A, 11B, 11C, 11D. The second surface 12 includes second corner portions 12A, 12B, 12C, 12C. Each of the first corner portions 11A to 11D and each of the second corner portions 12A to 12D may face one another in the Z direction. Each of the first surface 11 and the second surface 12 may extend along the XY plane. Each of the first surface 11 and the second surface 12 may be roughly square-shaped.

The side surfaces 13 to 16 connect the first surface 11 and the second surface 12. For example, the side surface 13 connects a portion of the first surface 11 between the first corner portion 11A and the first corner portion 11B and a portion of the second surface 12 between the second corner portion 12A and the second corner portion 12B. The side surface 14 connects a portion of the first surface 11 between the first corner portion 11B and the first corner portion 11C and a portion of the second surface 12 between the second corner portion 12B and the second corner portion 12C. The side surface 15 connects a portion of the first surface 11 between the first corner portion 11C and the first corner portion 11D and a portion of the second surface 12 between the second corner portion 12C and the second corner portion 12D. The side surface 16 connects a portion of the first surface 11 between the first corner portion 11D and the first corner portion 11A and a portion of the second surface 12 between the second corner portion 12D and the second corner portion 12A.

The side surface 13 and the side surface 15 may face one another in the X direction. The side surface 14 and the side surface 16 may face one another in the Y direction. Each of the side surfaces 13 to 16 may be roughly rectangular and, for example, have the same shape.

As illustrated in FIG. 2, a component such as an RF module 90 described below is located inside the housing portion 17. The housing portion 17 is surrounded by the first surface 11, the second surface 12, and the side surfaces 13 to 16. The housing portion 17 may be defined as a region surrounded by the first surface 11, the second surface 12, and the side surfaces 13 to 16.

As illustrated in FIG. 1, the first conductor group 20 surrounds the front surface of the housing 10. The first conductor group 20 may be formed on the front surface of the housing 10 by curing uncured electrically conductive material applied to the top surface of the housing 10. For example, the first conductor group 20 covers the front surface of the housing 10 leaving a gap S1 and a gap S2. The gap S1 extends from a central portion in the X direction on a side of the side surface 16 on the negative Z-axis side, through the second surface 12, to a central portion in the X direction on a side of the side surface 14 illustrated in FIG. 3 on the negative Z-axis side. The gap S2 extends from a central portion in the Y direction on a side of the side surface 13 on the negative Z-axis side, through the second surface 12, to a central portion in the Y direction on a side of the side surface 15 illustrated in FIG. 3 on the negative Z-axis side. The gap S1 and the gap S2 can be roughly orthogonal to the second surface 12. The width of the gap S1 in the X direction and the width of the gap S2 in the Y direction may be the same or different.

Figure 4:
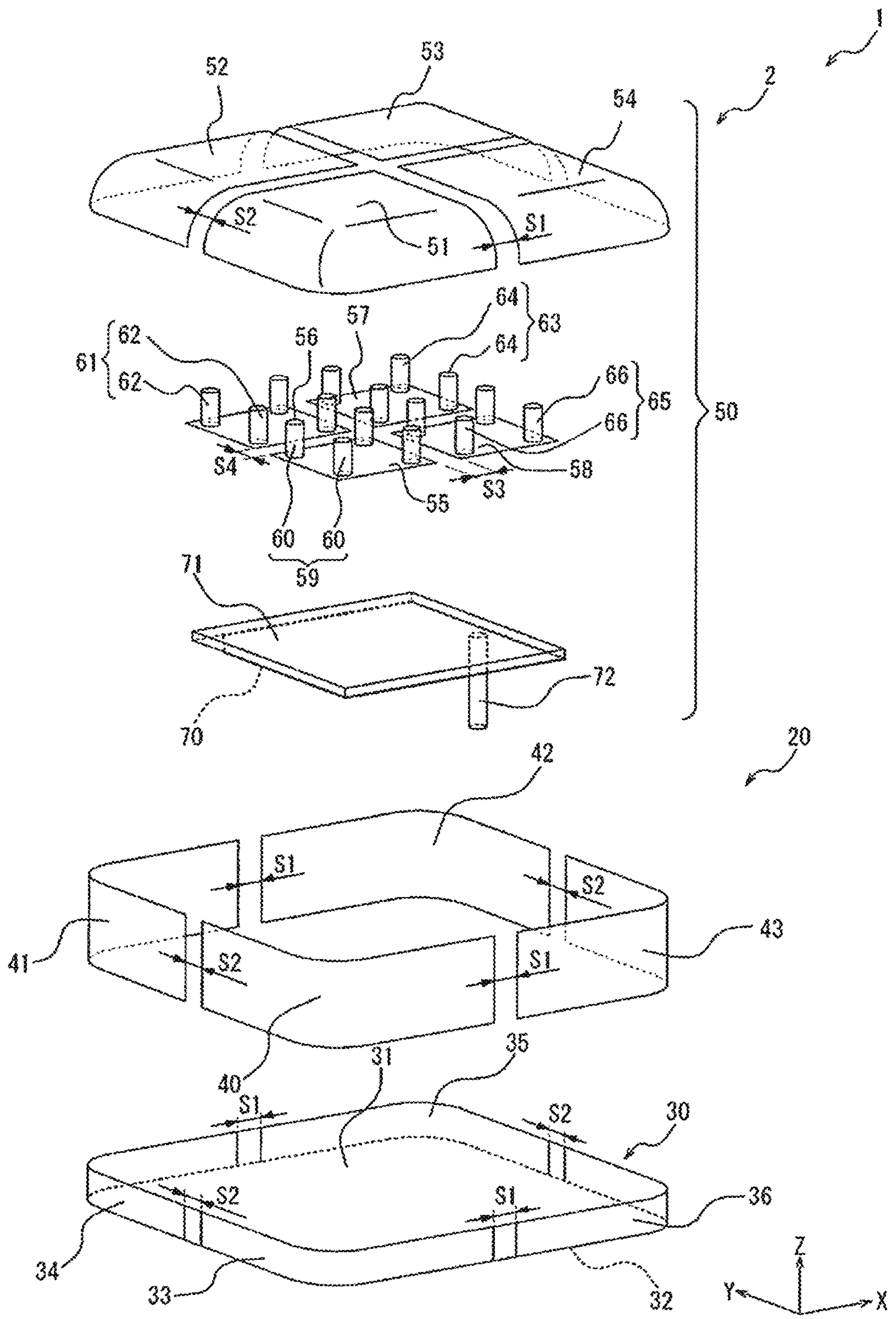
FIG. 4 is an exploded perspective view of a portion of the wireless communication device illustrated in FIG. 1.

As illustrated in FIG. 4, the first conductor group 20 includes a first conductor 30, second conductors 40, 41, 42, 43, and a second conductor group 50. The first conductor 30, the second conductors 40 to 43, and the second conductor group 50 may be formed of the same electrically conductive material or may be formed of different electrically conductive materials.

The first conductor 30 extends along the first surface 11 of the housing 10. The first conductor 30 may be configured to surround the periphery of the first surface 11. In other words, the first surface 11 may be included within the first conductor 30. By including the first surface 11 within the first conductor 30, the overall weight of the wireless communication device 1 can be reduced compared with a case where the interior of the first conductor 30 is composed of a conductor. The electric potential of the first conductor 30 may be used as a reference potential of the wireless communication device 1.

The first conductor 30 may include an upper surface 31, a lower surface 32, and side surfaces 33, 34, 35, 36. The upper surface 31 and the lower surface 32 face one another in the Z direction. The side surfaces 33 to 36 electrically connect the upper surface 31 and the lower surface 32. The side surfaces 33 to 36 are located separated from one another. For example, in the Y direction, the end portions of the opposing side surface 33 and side surface 34 are located separated by the gap S2. In the Y direction, the end portions of the opposing side surface 35 and side surface 36 are located separated by the gap S2. In the X direction, the end portions of the opposing side surface 33 and side surface 36 are located separated by the gap S1. In the X direction, the end portions of the opposing side surface 34 and side surface 35 are located separated by the gap S1.

The second conductors 40 to 43 are located separated from one another. For example, in the Y direction, the end portions of the opposing second conductor 40 and second conductor 41 are located separated by the gap S2. In the Y direction, the end portions of the opposing second conductor 42 and second conductor 43 are located separated by the gap S2. In the X direction, the end portions of the opposing second conductor 40 and second conductor 43 are located separated by the gap S1. In the X direction, the end portions of the opposing second conductor 41 and second conductor 42 are located separated by the gap S1.

The second conductors 40 to 43 are electrically connected to the first conductor 30. For example, the second conductor 40 is electrically connected to the side surface 33 of the first conductor 30. The second conductor 41 is electrically connected to the side surface 34 of the first conductor 30. The second conductor 42 is electrically connected to the side surface 35 of the first conductor 30. The second conductor 43 is electrically connected to the side surface 36 of the first conductor 30.

The second conductor 40 extends along a portion of the side surface 13 and a portion of the side surface 16 of the housing 10 from the first corner 11A toward the second corner 12A of the housing 10 illustrated in FIG. 3. The second conductor 41 extends along a portion of the side surface 13 and a portion of the side surface 14 of the housing 10 from the first corner portion 11B toward the second corner portion 12B of the housing 10 illustrated in FIG. 3. The second conductor 42 extends along a portion of the side surface 14 and a portion of the side surface 15 of the housing 10 from the first corner portion 11C toward the second corner portion 12C of the housing 10 illustrated in FIG. 3. The second conductor 43 extends along a portion of the side surface 15 and a portion of the side surface 16 of the housing 10 from the first corner portion 11D toward the second corner portion 12D of the housing 10 illustrated in FIG. 3.

The second conductor group 50 extends along the second surface 12 of the housing 10. The second conductor group 50 capacitively couples the second conductors 40 to 43. In the XY plane, the periphery of the second conductor group 50 is surrounded by the second conductors 40 to 43. As the second conductor group 50 is surrounded in the XY plane by the second conductors 40 to 43, as viewed from the second conductor group 50, the second conductors 40 to 43 can be seen as electrical walls surrounding the second conductor group 50. In other words, as viewed from the second conductor group 50, the YZ plane on the positive X-axis side, the YZ plane on the negative X-axis side, the XZ plane on the positive Y-axis side, and the XZ plane on the negative Y-axis side can be seen as electrical walls. Because the second conductor group 50 is surrounded by these four electrical walls, the antenna 2 can emit two electromagnetic waves with the electric field components orthogonal to each other toward the positive Z-axis side. Two electromagnetic waves with the orthogonal electric field components are also referred to as "orthogonal modes". For example, the antenna 2 may emit electromagnetic waves with the electric field component along X=Y and electromagnetic waves with the electric field component along X=−Y toward the positive Z-axis direction. When the phase difference between the two electromagnetic waves with orthogonal electric field components is 90 degrees, the two electromagnetic waves combine and, consequently, the antenna 2 emits circularly polarized waves. Also, the second conductor group 50 is surrounded by these four electrical walls, thus the antenna 2 exhibits an artificial magnetic conductor character with respect to a predetermined frequency of electromagnetic waves incident on the XY plane of the wireless communication device 1 from the positive Z-axis side.

As illustrated in FIG. 4, the second conductor group 50 includes connection conductors 51, 52, 53, 54, inner conductors 55, 56, 57, 58, and conductor sets 59, 61, 63, 65. The second conductor group 50 may include a third conductor 70.

As illustrated in FIG. 1, the connection conductors 51 to 54 extend along the second surface 12 of the housing 10. For example, the connection conductors 51 to 54 extend along the second surface 12 in a square grid-like shape. Each of the connection conductors 51 to 54 may be roughly square-shaped and, for example, have the same shape. Each of the connection conductors 51 to 54, which are roughly square-shaped, may include two sides substantially parallel to the X direction and two sides substantially parallel to the Y direction. At least a portion of each of the connection conductors 51 to 54 may be exposed to outside of the housing 10 from the second surface 12. Each of the connection conductors 51 to 54 may be located on the front surface of the second surface 12 corresponding to the outward-facing surface of the housing 10.

The connection conductors 51 to 54 are located separated from one another. For example, the connection conductor 51 and the connection conductor 52 are located separated in the Y direction by the gap S2. The connection conductor 53 and the connection conductor 54 are located separated in the Y direction by the gap S2. The connection conductor 51 and the connection conductor 54 are located separated in the X direction by the gap S1. The connection conductor 52 and the connection conductor 53 are located separated in the X direction by the gap S1.

Each of the connection conductors 51 to 54 are electrically connected to the second conductors 40 to 41. For example, the side on the negative Y-axis side of the two sides substantially parallel to the X direction of the connection conductor 51 and the side on the negative X-axis of the two sides substantially parallel to the Y direction of the connection conductor 51 are connected at a portion on the positive Z-axis side of the second conductor 40. The side on the positive Y-axis side of the two sides substantially parallel to the X direction of the connection conductor 52 and the side on the negative X-axis of the two sides substantially parallel to the Y direction of the connection conductor 52 are connected at a portion on the positive Z-axis side of the second conductor 41. The side on the positive Y-axis side of the two sides substantially parallel to the X direction of the connection conductor 53 and the side on the positive X-axis of the two sides substantially parallel to the Y direction of the connection conductor 53 are connected at a portion on the positive Z-axis side of the second conductor 42. The side on the negative Y-axis side of the two sides substantially parallel to the X direction of the connection conductor 54 and the side on the positive X-axis of the two sides substantially parallel to the Y direction of the connection conductor 54 are connected at a portion on the positive Z-axis side of the second conductor 43.

The inner conductors 55 to 58 are located closer to the housing portion 17 of the housing 10 than the connection conductors 51 to 54. Each of the inner conductors 55 to 58 faces the connection conductors 51 to 54 in the Z direction. As illustrated in FIG. 2, at least a portion of the inner conductors 55 to 58 may be exposed to the housing portion 17 of the housing 10. Each of the inner conductors 55 to 58 may be located on the front surface of the second surface of the housing 10 corresponding to the inward-facing surface of the housing 10. The inner conductors 55 to 58 may be roughly square-shaped and, for example, have the same shape.

The inner conductors 55 to 58 are located separated from one another. For example, as illustrated in FIG. 4, the inner conductor 55 and the inner conductor 56 are located separated in the Y direction by a gap S4. The inner conductor 57 and the inner conductor 58 are located separated in the Y direction by the gap S4. The inner conductor 56 and the inner conductor 57 are located separated in the X direction by a gap S3. The inner conductor 58 and the inner conductor 55 are located separated in the X direction by the gap S3. The inner conductors 55 to 58 are capacitively coupled via the gap S3 and the gap S4. The width of the gap S3 and the width of the gap S4 may be the same or different. The width of the gap S3 and the width of the gap S4 may be appropriately adjusted in consideration of the desired magnitude of the capacitive coupling between the inner conductors 55 to 58.

A capacitor may be connected between adjacent ones of the inner conductors 55 to 58. For example, the capacitor may be connected at least between the inner conductor 55 and the inner conductor 56 adjacent in the Y direction and/or between the inner conductor 57 and the inner conductor 58 adjacent in the Y direction. For example, the capacitor may be connected at least between the inner conductor 56 and the inner conductor 57 adjacent in the X direction and/or between the inner conductor 55 and the inner conductor 58 adjacent in the X direction. The capacitor may be used to bring the magnitude of the capacitive coupling between the inner conductors 55 to 58 to a desired value. Connecting the capacitor allows the capacitive coupling between the inner conductors 55 to 58 to be increased.

The conductor set 59 electrically connects the connection conductor 51 and the inner conductor 55. The conductor set 59 includes at least one coupling conductor 60. In the present embodiment, the conductor set 59 includes a plurality of coupling conductors 60. The plurality of coupling conductors 60 are located separated from one another in the X direction and the Y direction. One end of the coupling conductor 60 is electrically connected to the connection conductor 51. The other end of the coupling conductor 60 is electrically connected to the inner conductor 55. The coupling conductor 60 may extend along the Z direction. At least a portion of the coupling conductor 60 may be located within the second surface 12 of the housing 10. The coupling conductor 60 may be a through hole conductor, a via conductor, or the like.

The conductor set 61 electrically connects the connection conductor 52 and the inner conductor 56. The conductor set 61 includes at least one coupling conductor 62. In the present embodiment, the conductor set 61 includes a plurality of coupling conductors 62. The plurality of coupling conductors 62 are located separated from one another in the X direction and the Y direction. One end of the coupling conductor 62 is electrically connected to the connection conductor 52. The other end of the coupling conductor 62 is electrically connected to the inner conductor 56. The coupling conductor 62 may extend along the Z direction. At least a portion of the coupling conductor 62 may be located within the second surface 12 of the housing 10. The coupling conductor 62 may be a through hole conductor, a via conductor, or the like.

The conductor set 63 electrically connects the connection conductor 53 and the inner conductor 57. The conductor set 63 includes at least one coupling conductor 64. In the present embodiment, the conductor set 63 includes a plurality of coupling conductors 64. The plurality of coupling conductors 64 are located separated from one another in the X direction and the Y direction. One end of the coupling conductor 64 is electrically connected to the connection conductor 53. The other end of the coupling conductor 64 is electrically connected to the inner conductor 57. The coupling conductor 64 may extend along the Z direction. At least a portion of the coupling conductor 64 may be located within the second surface 12 of the housing 10. The coupling conductor 64 may be a through hole conductor, a via conductor, or the like.

The conductor set 65 electrically connects the connection conductor 54 and the inner conductor 58. The conductor set 65 includes at least one coupling conductor 66. In the present embodiment, the conductor set 65 includes a plurality of coupling conductors 66. The plurality of coupling conductors 66 are located separated from one another in the X direction and the Y direction. One end of the coupling conductor 66 is electrically connected to the connection conductor 54. The other end of the coupling conductor 66 is electrically connected to the inner conductor 58. The coupling conductor 66 may extend along the Z direction. At least a portion of the coupling conductor 66 may be located within the second surface 12 of the housing 10. The coupling conductor 66 may be a through hole conductor, a via conductor, or the like.

As illustrated in FIG. 4, the third conductor 70 faces the inner conductors 55 to 58. The third conductor 70 is located more to the negative Z-axis side than the inner conductors 55 to 58. The third conductor 70 capacitively couples the inner conductors 55 to 58. Capacitively coupling the inner conductors 55 to 58 with the third conductor 70 allows the capacitive coupling between the inner conductors 55 to 58 to be increased. The third conductor 70 may be roughly square-shaped. As illustrated in FIG. 2, the dielectric substrate 71 may be located between the third conductor 70 and the inner conductors 55 to 58. The dielectric material included in the dielectric substrate 71 can be the same as or different from the dielectric material included in the housing 10. The dielectric constant of the dielectric substrate 71 may be appropriately adjusted in consideration of the desired magnitude of the capacitive coupling between the inner conductors 55 to 58. The area of the third conductor 70 may be appropriately adjusted in consideration of the desired magnitude of the capacitive coupling between the inner conductors 55 to 58. The third conductor 70 may have a cutout or projection at a portion as described below. In the example illustrated in FIG. 4, the third conductor 70, which is roughly square-shaped, includes a cutout at a corner portion, from among the four corner portions of the roughly square shape, located on the negative X-axis side and located on the positive Y-axis side.

The power supply line 72 is electrically connected to any one portion of the second conductor group 50. In the present disclosure, an "electromagnetic connection" may be an electrical connection or a magnetic connection. In the present embodiment, one end of the power supply line 72 is connected to the third conductor 70 of the second conductor group 50. The other end of the power supply line 72 is electrically connected to the RF module 90 described below. The power supply line 72 is located within the housing portion 17 of the housing 10. The power supply line 72 may extend along the Z direction. The power supply line 72 may be a through hole conductor, a via conductor, or the like.

When the antenna 2 emits electromagnetic waves, the power supply line 72 supplies power from the RF module 90 described below to the second conductor group 50. By appropriately selecting the phase of the alternating current power supplied from the power supply line 72 to the second conductor group 50, it is possible to appropriately select the right-turning or left-turning circularly polarized waves and emit them from the antenna 2. However, the third conductor 70 may include, at a portion, a cutout or projection that perturbs two orthogonal modes that make up the circularly polarized waves. If this perturbation is not provided, the waves become linearly polarized.

As illustrated in FIG. 2, the circuit board 80 is located within the housing portion 17 of the housing 10. The circuit board 80 may be a printed circuit board (PCB). Components such as the RF module 90 described below may be disposed on the circuit board 80. The circuit board 80 includes an insulation substrate 81, a conductor layer 82, and a conductor layer 83. The insulation substrate 81 is substantially parallel to the XY plane. The conductor layer 82 is located on the surface on the positive Z-axis side of the two surfaces that are substantially parallel to the XY plane included in the insulation substrate 81. The conductor layer 82 electrically connects various components disposed on the circuit board 80. The conductor layer 82 is also referred to as a wiring layer. The conductor layer 83 is located on the surface on the negative Z-axis side of the two surfaces that are substantially parallel to the XY plane included in the insulation substrate 81. The conductor layer 83 is electrically connected to the upper surface 31 of the first conductor 30 by, for example, an electrically conductive adhesive. The conductor layer 83 is also referred to as a ground layer. The conductor layer 83 may be integrally formed with the upper surface 31 of the first conductor 30.

Figure 5:
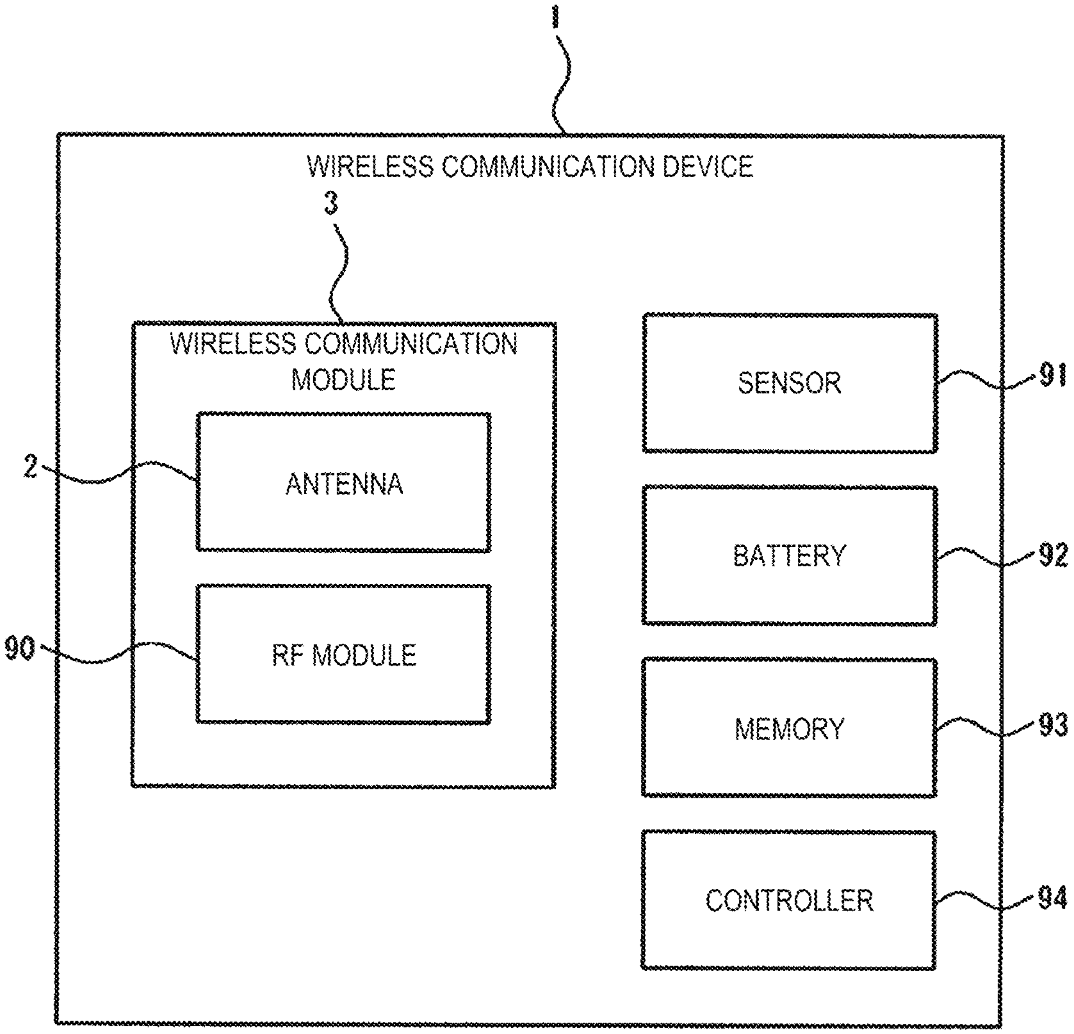
FIG. 5 is a functional block diagram of the wireless communication device illustrated in FIG. 1.

As illustrated in FIG. 5, the wireless communication device 1 includes a wireless communication module 3, a sensor 91, a battery 92, a memory 93, and a controller 94. The wireless communication module 3 includes the antenna 2 and the RF module 90.

As illustrated in FIG. 2, the RF module 90 is located within the housing portion 17 of the housing 10. The RF module 90 is located on the circuit board 80. The RF module 90 is electrically connected to the power supply line 72. The RF module 90 is electrically connected to the antenna 2 via the power supply line 72.

The RF module 90 may control the electrical power supplied to the antenna 2. The RF module 90 modulates the baseband signal and generates an RF signal. RF signals generated by the RF module 90 may be emitted from the antenna 2. The RF module 90 may modulate an electrical signal received by the antenna 2 into a baseband signal. The RF module 90 outputs a baseband signal to the controller 94.

As illustrated in FIG. 2, the sensor 91 is located within the housing portion 17 of housing 10. The sensor 91 may be located on the circuit board 80. The sensor 91 may, for example, include at least one of a speed sensor, a vibration sensor, an acceleration sensor, a gyro sensor, a rotation angle sensor, an angular velocity sensor, a geomagnetic sensor, a magnetic sensor, a temperature sensor, a humidity sensor, an atmospheric pressure sensor, a light sensor, an illuminance sensor, a UV sensor, a gas sensor, a gas density sensor, an atmospheric sensor, a level sensor, an odor sensor, a pressure sensor, an air pressure sensor, a contact sensor, a wind sensor, an infrared sensor, a human sensor, a displacement sensor, an image sensor, a weight sensor, a smoke sensor, a leak sensor, a vital sensor, a battery level sensor, an ultrasound sensor, a global positioning system (GPS) signal receiver, or the like. The sensor 91 outputs the detection result to the controller 94.

As illustrated in FIG. 2, the battery 92 is located more to the negative Z-axis side than the lower surface 32 of the first conductor 30. The battery 92 may be located outside the housing 10. The battery 92 is capable of supplying electrical power to the components of the wireless communication device 1. The battery 92 may provide electrical power to at least one of the RF module 90, the sensor 91, the memory 93, or the controller 94. The battery 92 may include at least one of a primary battery or a secondary battery. The negative pole of the battery 92 is electrically connected to the first conductor 30 of the antenna 2.

As illustrated in FIG. 2, the memory 93 is located within the housing portion 17 of the housing 10. The memory 93 may be located on the circuit board 80. The memory 93 may include, for example, a semiconductor memory or the like. The memory 93 may function as a working memory for the controller 94. The memory 93 may be included in the controller 94. The memory 93 stores programs describing processing contents for implementing the functions of the wireless communication device 1, information used for processing in the wireless communication device 1, and the like.

As illustrated in FIG. 2, the controller 94 is located within the housing portion 17 of the housing 10. The controller 94 may be located on the circuit board 80.

The controller 94 may include a processor, for example. The controller 94 may include one or more processors. The processor may include a general-purpose processor that reads a specific program in order to execute a specific function, and a dedicated processor dedicated to specific processing. A dedicated processor may include an application-specific IC. The application-specific IC is also referred to as an Application Specific Integrated Circuit (ASIC). The processor may include a programmable logic device. The programmable logic device is also called a Programmable Logic Device (PLD).

The PLD may include a Field-Programmable Gate Array (FPGA). The controller 94 may be either a System-on-a-Chip (SoC) or a System In a Package (SiP) that cooperates with one or more processors. The controller 94 may store various information and programs for causing the memory 93 to operate the components of the wireless communication device 1.

The controller 94 generates a baseband signal. For example, the controller 94 obtains the detection result of the sensor 91. The controller 94 generates a baseband signal according to the obtained detection result. The controller 94 outputs the generated baseband signal to the RF module 90.

The controller 94 may obtain a baseband signal from RF module 90. The controller 94 executes processing according to the obtained baseband signal.

As described above, in the wireless communication device 1 according to the first embodiment, even if there are no rows of resonator structures, the antenna 2 can emit electromagnetic waves without reducing emission efficiency. Furthermore, the antenna 2 includes the housing 10 made of a resin and the first conductor group 20 surrounding the front surface of the housing 10. In other words, in the present embodiment, the antenna 2 can be configured with the housing 10 of the wireless communication device 1. Configuring the antenna 2 with the housing 10 can reduce the number of components composing the antenna 2 in the wireless communication device 1. Thus, according to the present embodiment, the antenna 2, wireless communication module 3, and wireless communication device 1, which are novel, can be provided.

Second Embodiment

Figure 6:
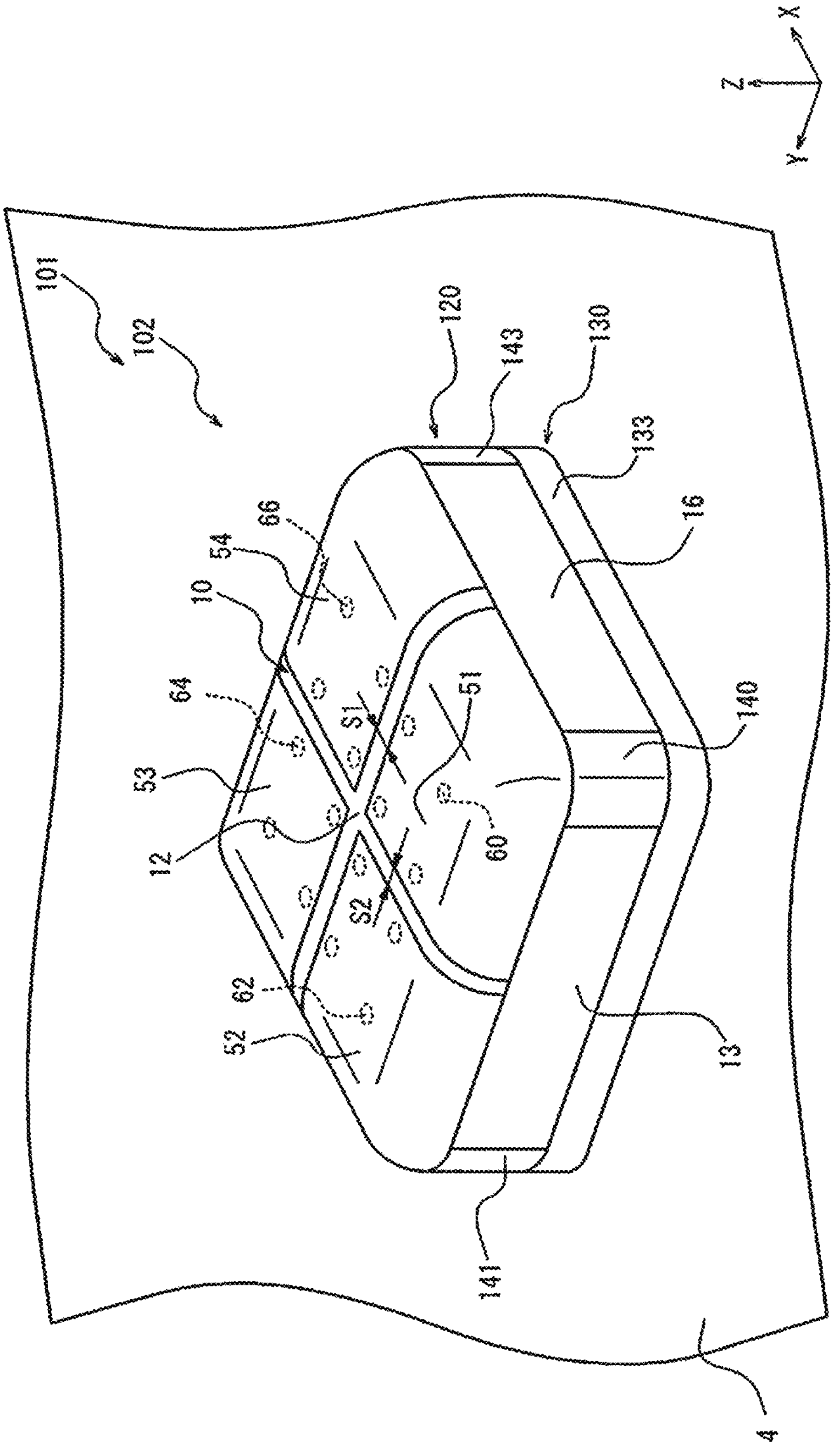
FIG. 6 is a perspective view of a wireless communication device according to a second embodiment of the present disclosure.
Figure 7:
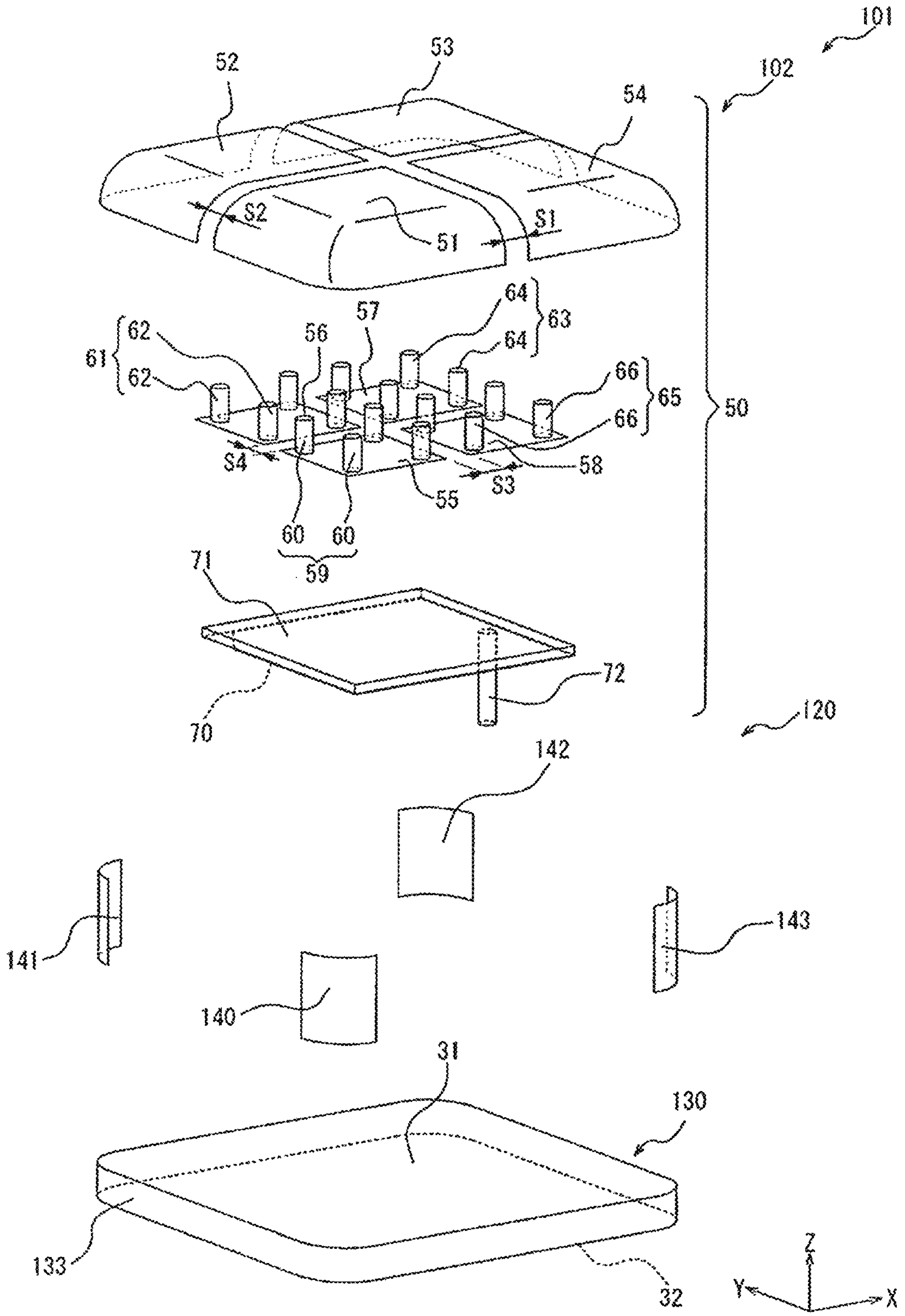
FIG. 7 is an exploded perspective view of a portion of the wireless communication device illustrated in FIG. 6.

FIG. 6 is a perspective view of a wireless communication device 101 according to the second embodiment of the present disclosure. FIG. 7 is an exploded perspective view of a portion of the wireless communication device 101 illustrated in FIG. 6.

As illustrated in FIG. 6, the wireless communication device 101 includes an antenna 102. The wireless communication device 101 may include the circuit board 80 as illustrated in FIG. 2. Also, as illustrated in FIG. 5, the wireless communication device 101 includes the wireless communication module 3, the sensor 91, the battery 92, the memory 93, and the controller 94. The wireless communication module 3 included in the wireless communication device 101 includes the antenna 102 and the RF module 90 as illustrated in FIG. 5.

As illustrated in FIGS. 6 and 7, the antenna 102 includes the housing 10, a first conductor group 120, and the power supply line 72. As illustrated in FIG. 7, the first conductor group 120 includes a first conductor 130, second conductors 140, 141, 142, 143, and the second conductor group 50.

As illustrated in FIG. 7, the first conductor 130 includes the upper surface 31, the lower surface 32, and the side surface 133. The side surface 133 electrically connects the upper surface 31 and the lower surface 32. The side surface 133 continuously surrounds the periphery of first surface 11 of the housing 10 illustrated in FIG. 3.

Similar to the first embodiment, the second conductors 140 to 143 are located separated from one another. Similar to the first embodiment, the second conductors 140 to 143 are electrically connected to the first conductor 130. Similar to the first embodiment, each of the second conductors 140 to 143 extends from one of the first corners 11A to 11D of the housing 10 illustrated in FIG. 3 toward one of the second corners 12A to 12D.

The width of the second conductors 140 to 143 is less than the width of the second conductors 40 to 43 according to the first embodiment. The shape of the second conductors 140 to 143 is a pillar shape extending along the Z direction. Similar to the first embodiment, the periphery of the second conductor group 50 in the XY plane is surrounded by the second conductors 140 to 143. As viewed from the second conductor group 50, the set of the second conductors 140, 141 is seen as an electrical wall extending in the YZ plane on the negative X-axis side, and the set of the second conductors 142, 143 is seen as an electrical wall extending in the YZ plane on the positive X-axis side. Also, as viewed from the second conductor group 50, the set of the second conductors 140, 143 is seen as an electrical wall extending in the XZ plane on the negative Y-axis side, and the set of the second conductors 141, 142 is seen as an electrical wall extending in the XZ plane on the positive Y-axis side. In other words, as in the first embodiment, as viewed from the second conductor group 50, the YZ plane on the positive X-axis side, the YZ plane on the negative X-axis side, the XZ plane on the positive Y-axis side, and the XZ plane on the negative Y-axis side are seen as electrical walls. As the second conductor group 50 is surrounded by these four electrical walls, the antenna 102 can emit circularly polarized waves, in a similar manner to the first embodiment. The third conductor 70 may include, at a portion, a cutout, projection, or the like that perturbs two orthogonal modes that make up the circularly polarized waves. If this perturbation is not provided, the waves become linearly polarized. Also, the second conductor group 50 is surrounded by these four electrical walls. Thus, as in the first embodiment, the antenna 102 exhibits an artificial magnetic conductor character with respect to a predetermined frequency of electromagnetic waves incident on the XY plane of the wireless communication device 1 from the positive Z-axis side.

The other configuration and effect of the antenna 102 according to the second embodiment is the same as the antenna 2 according to the first embodiment.

Third Embodiment

In the first and second embodiments, as illustrated in FIG. 3, the housing 10 includes the first surface 11 that includes the four first corner portions 11A to 11D and the second surface 12 that includes the four second corner portions 12A to 12D. However, the first surface of the housing of the present disclosure is only required to include at least three first corner portions. Also, the second surface of the housing of the present disclosure is only required to include at least three second corner portions. In the configuration according to the third embodiment described below, the first surface and the second surface of the housing includes three first corner portions and three second corner portions, respectively.

Figure 8:
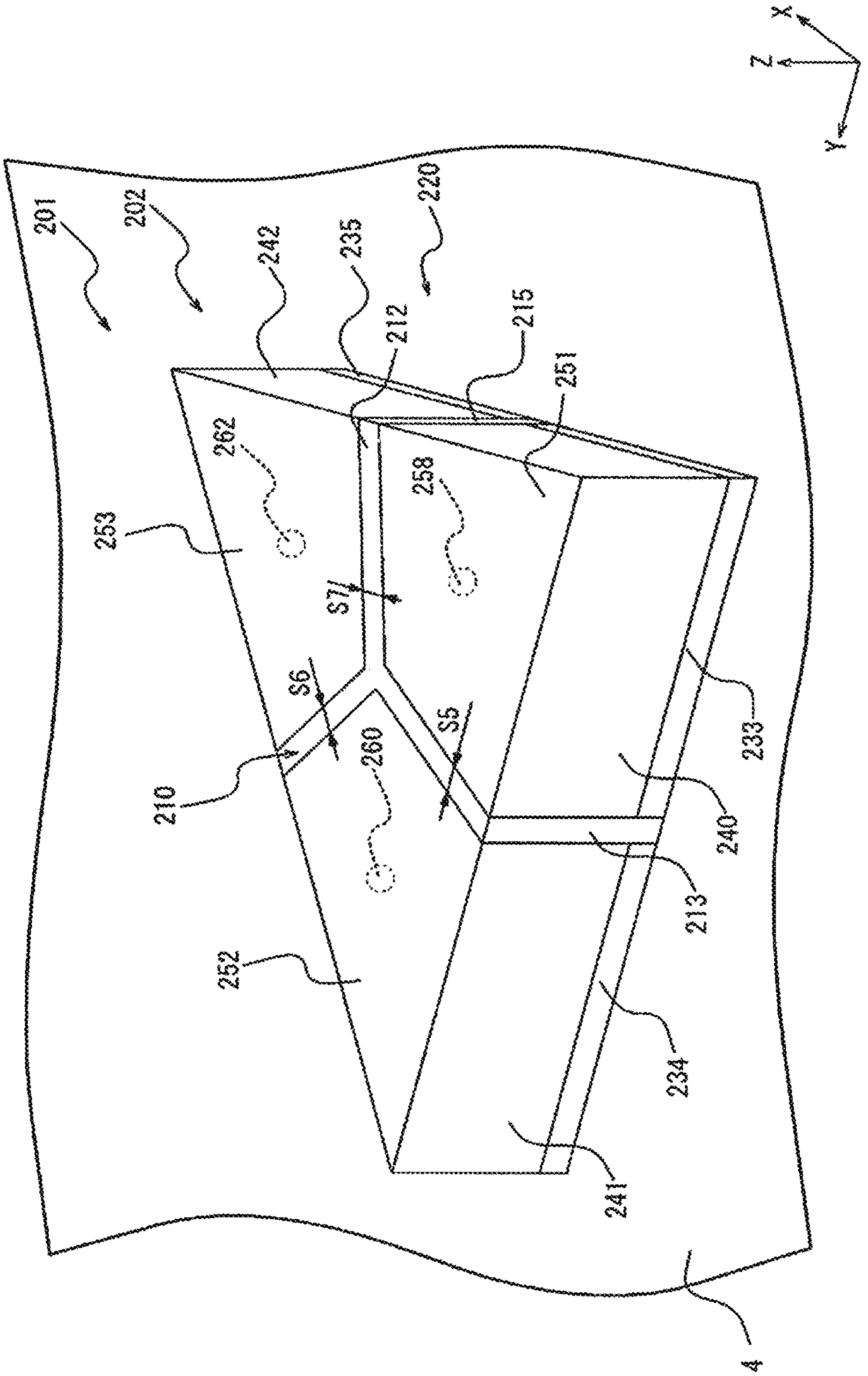
FIG. 8 is a perspective view of a wireless communication device according to a third embodiment of the present disclosure.
Figure 9:
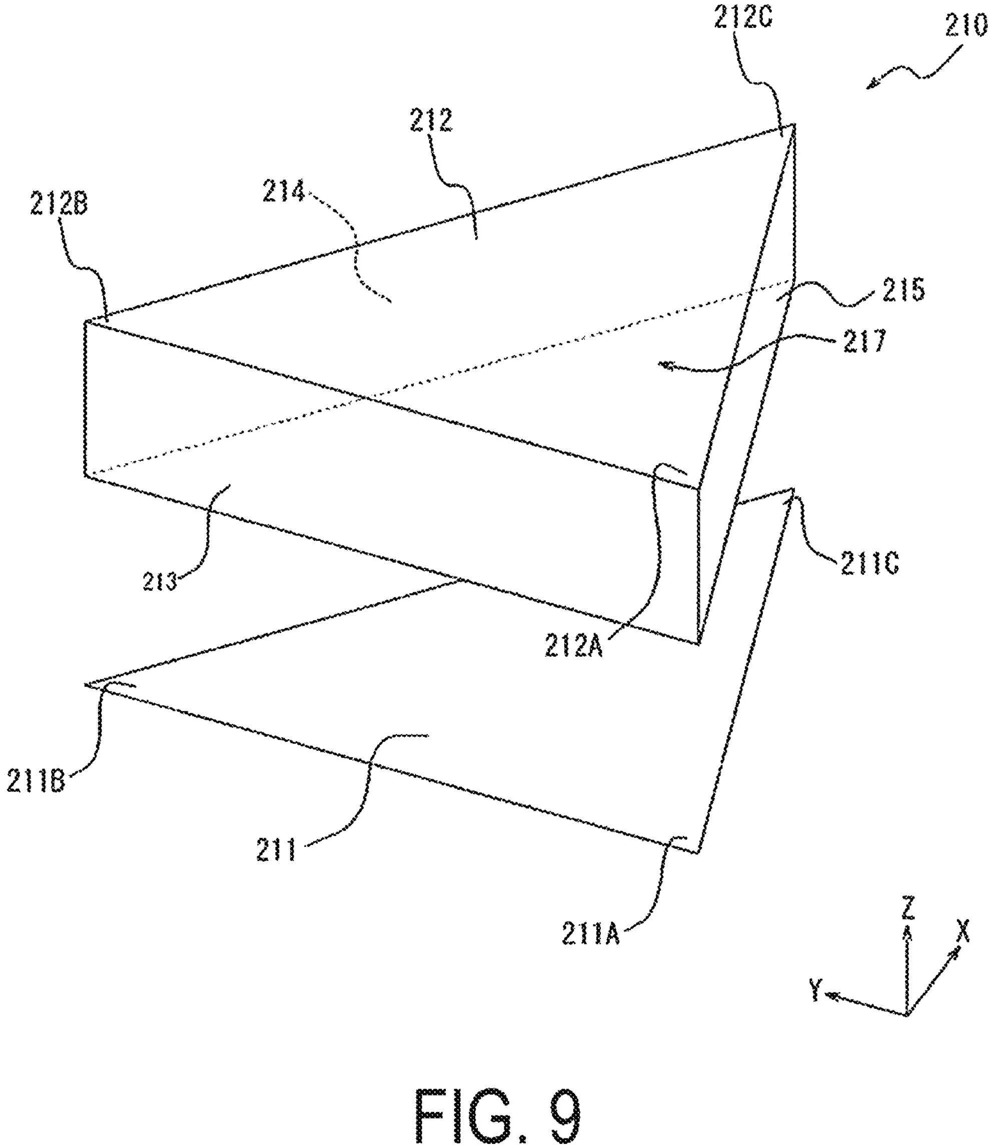
FIG. 9 is an exploded perspective view of a portion of a housing illustrated in FIG. 8.
Figure 10:
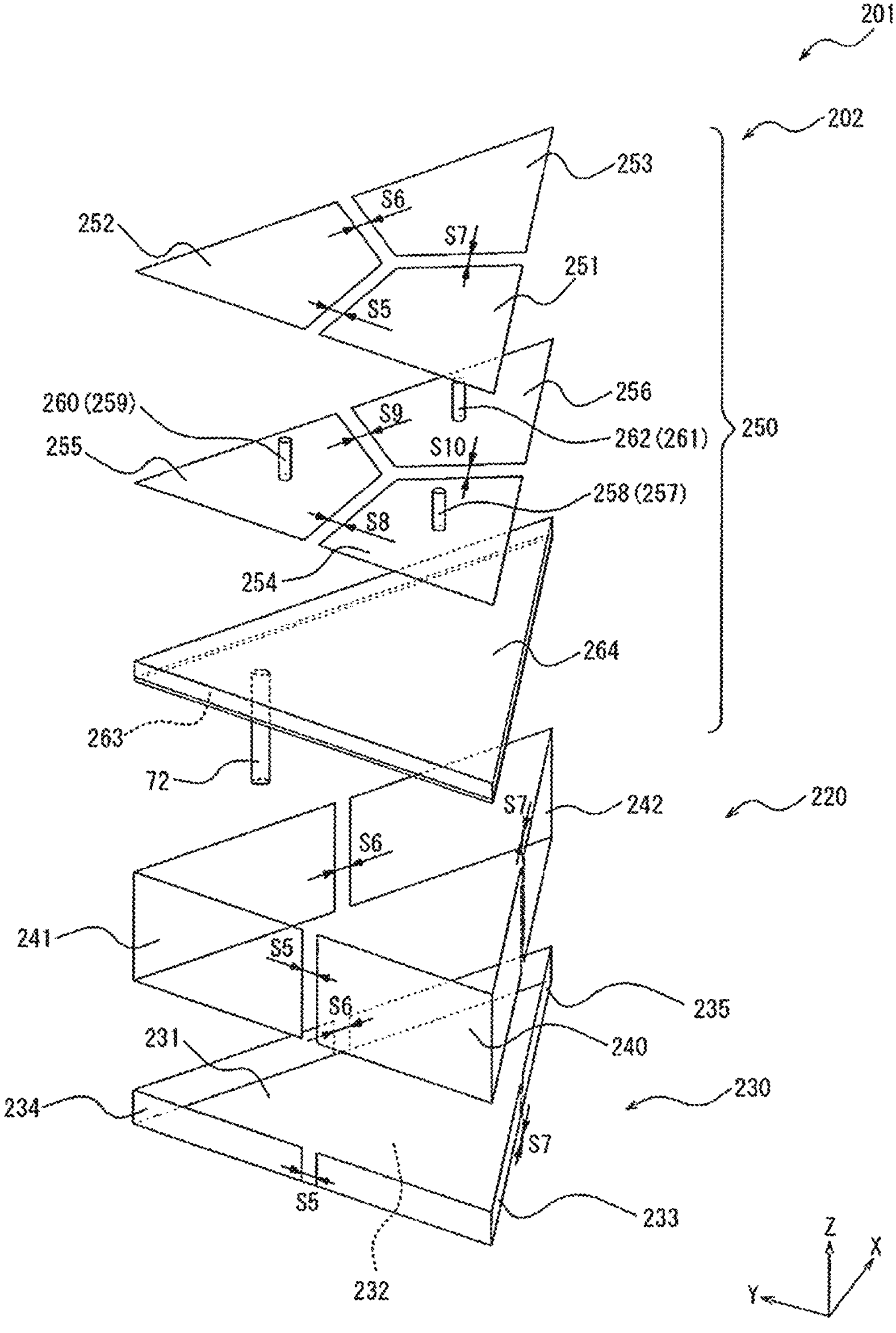
FIG. 10 is an exploded perspective view of a portion of the wireless communication device illustrated in FIG. 8.

FIG. 8 is a perspective view of a wireless communication device 201 according to the third embodiment of the present disclosure. FIG. 9 is an exploded perspective view of a portion of a housing 210 illustrated in FIG. 8. FIG. 10 is an exploded perspective view of a portion of the wireless communication device 201 illustrated in FIG. 8.

As illustrated in FIG. 8, a wireless communication device 201 is roughly an equilateral triangular prism. The wireless communication device 201, which is roughly an equilateral triangular prism, includes two surfaces that are substantially parallel to the XY plane. The two surfaces are roughly equilateral triangles. One of the three sides of the roughly equilateral triangle is substantially parallel to the Y direction. The wireless communication device 201 includes an antenna 202. The wireless communication device 201 may include the circuit board 80 as illustrated in FIG. 2. Also, as illustrated in FIG. 5, the wireless communication device 201 includes the wireless communication module 3, the sensor 91, the battery 92, the memory 93, and the controller 94. The wireless communication module 3 includes the antenna 202 illustrated in FIG. 8 and the RF module 90 as illustrated in FIG. 5.

The antenna 202 is capable of emitting circularly polarized waves as in the first embodiment. As in the first embodiment, the antenna 202 exhibits an artificial magnetic conductor character with respect to a predetermined frequency of electromagnetic waves incident on the XY plane of the wireless communication device 201 from the positive Z-axis side. Because the antenna 202 exhibits such an artificial magnetic conductor character, as in the first embodiment, the emission efficiency of the antenna 202 can be maintained even when a metal plate 4 is positioned on the negative Z-axis side of the wireless communication device 201.

As illustrated in FIGS. 8 and 10, the antenna 202 includes the housing 210, a first conductor group 220, and the power supply line 72. As in the first embodiment, the antenna 202 is configured with the housing 210 of the wireless communication device 201. As illustrated in FIG. 10, the antenna 202 may include a dielectric substrate 264.

Various components of the wireless communication device 201 are housed in the housing 210. The housing 210 is made of a resin. That is, the housing 210 includes a dielectric material. As illustrated in FIG. 9, the housing 210 is roughly an equilateral triangular prism. The corner portions of the housing 210, which is roughly an equilateral triangular prism, may have an angular shape. The corner portions of the housing 210, which is roughly an equilateral triangular prism, may have a rounded shape, as in the housing 10 illustrated in FIG. 3. The housing 210 includes a first surface 211, a second surface 212, side surfaces 213, 214, 215, and a housing portion 217.

The first surface 211 and the second surface 212 face each other in the Z direction. The first surface 211 includes first corner portions 211A, 211B, 211C. The second surface 212 includes second corner portions 212A, 212B, 212C. Each of the first corner portions 211A to 211C and each of the second corner portions 212A to 212C may face one another in the Z direction. Each of the first surface 211 and the second surface 212 may extend along the XY plane. Each of the first surface 211 and the second surface 212 may be roughly an equilateral triangle.

The side surfaces 213 to 215 connect the first surface 211 and the second surface 212. For example, the side surface 213 connects a portion of the first surface 211 between the first corner portion 211A and the first corner portion 211B and a portion of the second surface 212 between the second corner portion 212A and the second corner portion 212B. The side surface 214 connects a portion of the first surface 211 between the first corner portion 211B and the first corner portion 211C and a portion of the second surface 212 between the second corner portion 212B and the second corner portion 212C. The side surface 215 connects a portion of the first surface 211 between the first corner portion 211C and the first corner portion 211A and a portion of the second surface 212 between the second corner portion 212C and the second corner portion 212A. The side surfaces 213 to 215 may be roughly rectangular.

As with the housing portion 17 illustrated in FIG. 2, components such as the RF module 90, the sensor 91, the memory 93, and the controller 94 illustrated in FIG. 5 are located inside the housing portion 217. The housing portion 217 is surrounded by the first surface 211, the second surface 212, and the side surfaces 213 to 215. The housing portion 217 may be defined as a region surrounded by the first surface 211, the second surface 212, and the side surfaces 213 to 215.

As illustrated in FIG. 8, the first conductor group 220 covers the front surface of the housing 210. The first conductor group 220 may be formed on the front surface of the housing 210 by curing uncured electrically conductive material applied to the top surface of the housing 210. For example, the first conductor group 220 covers the front surface of the housing 210 leaving a gap S5, a gap S6, and a gap S7. The gap S5 extends from a central portion of the second surface 212, which is roughly an equilateral triangle, to a central portion of the side located on the negative Z-axis side of the third surface 213. The gap S6 extends from a central portion of the second surface 212, which is roughly an equilateral triangle, to a central portion of the side located on the negative Z-axis side of the fourth surface 214. The gap S7 extends from a central portion of the second surface 212, which is roughly an equilateral triangle, to a central portion of the side located on the negative Z-axis side of the fifth surface 215. The widths of the gap S5, the gap S6, and the gap S7 may be appropriately adjusted in accordance with the desired frequency used in the wireless communication device 201. The widths of the gap S5, the gap S6, and the gap S7 may be the same or different.

As illustrated in FIG. 10, the first conductor group 220 includes a first conductor 230, second conductors 240, 241, 242, and a second conductor group 250. Each of the first conductor 230, the second conductors 240 to 242, and the second conductor group 250 may be formed of the same electrically conductive material or may be formed of different electrically conductive materials.

The first conductor 230 extends along the first surface 211 of the housing 210 illustrated in FIG. 9. As with the first conductor 30 illustrated in FIG. 2, the first conductor 230 may be configured to surround the periphery of the first surface 211. As in the first embodiment, the electric potential of the first conductor 230 may be used as a reference potential of the wireless communication device 201.

The first conductor 230 may include an upper surface 231, a lower surface 232, and side surfaces 233, 234, 235. The upper surface 231 and the lower surface 232 face each other in the Z direction. The battery 92 illustrated in FIG. 2 may be located on the negative Z-axis side of the lower surface 232. The negative pole of the battery 92 is electrically connected to the first conductor 230.

The side surfaces 233 to 235 electrically connect the upper surface 231 and the lower surface 232. The side surfaces 233 to 235 are located separated from one another. For example, the end portions of the side surface 233 and the side surface 234, which oppose each other, are located separated by the gap S5. The end portions of the side surface 234 and the side surface 235, which oppose each other, are located separated by the gap S6. The end portions of the side surface 235 and the side surface 233, which oppose each other, are located separated by the gap S7.

The second conductors 240 to 242 are electrically connected to the first conductor 230. For example, the second conductor 240 is electrically connected to the side surface 233 of the first conductor 230. The second conductor 241 is electrically connected to the side surface 234 of the first conductor 230. The second conductor 242 is electrically connected to the side surface 235 of the first conductor 230.

The second conductor 240 extends along a portion of the side surface 213 and a portion of the side surface 215 of the housing 10 from the first corner portion 211A toward the second corner portion 212A of the housing 10 illustrated in FIG. 9. The second conductor 241 extends along a portion of the side surface 213 and a portion of the side surface 214 of the housing 10 from the first corner portion 211B toward the second corner portion 212B of the housing 10 illustrated in FIG. 9. The second conductor 242 extends along a portion of the side surface 214 and a portion of the side surface 215 of the housing 10 from the first corner portion 211C toward the second corner portion 212C of the housing 10 illustrated in FIG. 9.

The second conductor group 250 extends along the second surface 212 of the housing 210. The second conductor group 250 capacitively couples the second conductors 240 to 242. In the XY plane, the periphery of the second conductor group 50 is surrounded by the second conductors 240 to 242. As viewed from the second conductor group 250, the second conductors 240 to 242 are seen as three electrical walls surrounding the second conductor group 250. Because the second conductor group 250 is surrounded by these three electrical walls, the antenna 202 can emit two electromagnetic waves with the electric field components orthogonal to one another toward the positive Z-axis side. When the phase difference between the two electromagnetic waves with orthogonal electric field components is 90 degrees, the two electromagnetic waves combine and, consequently, the antenna 202 emits circularly polarized waves. Also, the second conductor group 250 is surrounded by these three electrical walls, thus the antenna 202 exhibits an artificial magnetic conductor character with respect to a predetermined frequency of electromagnetic waves incident on the XY plane of the wireless communication device 201 from the positive Z-axis side.

As illustrated in FIG. 10, the second conductor group 250 includes connection conductors 251, 252, 253, inner conductors 254, 255, 256, and conductor sets 257, 259, 261. The second conductor group 250 may include a third conductor 263.

As illustrated in FIG. 8, the connection conductors 251 to 253 extend along the second surface 212 of the housing 10. Each of the connection conductors 251 to 253 may be roughly quadrangular and, for example, have the same shape. At least a portion of each of the connection conductors 251 to 253 may be exposed from the second surface 212. Each of the connection conductors 251 to 253 may be located on the front surface of the second surface 212 corresponding to the outward-facing surface of the housing 210.

The connection conductors 251 to 253 are located separated from one another. For example, the connection conductor 251 and the connection conductor 252 are located separated by the gap S5. The connection conductor 252 and the connection conductor 253 are located separated by the gap S6. The connection conductor 253 and the connection conductor 251 are located separated by the gap S7.

The connection conductor 251 is electrically connected to the second conductor 240. The connection conductor 252 is electrically connected to the second conductor 241. The connection conductor 253 is electrically connected to the second conductor 242.

The inner conductors 254 to 256 are located closer to the housing portion 217 of the housing 210 than the connection conductors 251 to 253. Each of the inner conductors 254 to 256 face the connection conductors 251 to 253 in the Z direction. As with the inner conductors 55 to 58 illustrated in FIG. 2, at least a portion of each of the inner conductors 254 to 256 may be exposed to the housing portion 217 of the housing 210. Each of the inner conductors 254 to 256 may be located on the front surface of the second surface 212 of the housing 210 corresponding to the inward-facing surface of the housing 210. The inner conductors 254 to 256 may be roughly quadrangular and, for example, have the same shape.

The inner conductors 254 to 256 are located separated from one another. For example, as illustrated in FIG. 10, the inner conductor 254 and the inner conductor 255 are located separated in the Y direction by a gap S8. The inner conductor 255 and the inner conductor 256 are located separated by a gap S9. The inner conductor 256 and the inner conductor 254 are located separated by a gap S10. The positions in the XY plane of each of the gaps S8 to S10 may be the same as the position in the XY plane of each of the gaps S5 to S7. The inner conductors 254 to 256 are capacitively coupled via the gaps S8 to S10. The width of the gaps S8 to S10 may be the same or different. The width of the gaps S8 to S10 may be appropriately adjusted in consideration of the desired magnitude of the capacitive coupling between the inner conductors 254 to 256.

A capacitor may be connected between adjacent inner conductors 254 to 256. For example, the capacitor may be connected at at least one of the gap S8 between the adjacent inner conductor 254 and inner conductor 255, the gap S9 between the adjacent inner conductor 255 and inner conductor 256, or the gap S10 between the adjacent inner conductor 256 and inner conductor 254. The capacitor may be used to bring the magnitude of the capacitive coupling between the inner conductors 254 to 256 to a desired value. Connecting the capacitor allows the capacitive coupling between the inner conductors 254 to 256 to be increased.

The conductor set 257 electrically connects the connection conductor 251 and the inner conductor 254. The conductor set 257 includes at least one coupling conductor 258. In the present embodiment, the conductor set 257 includes one coupling conductor 258. However, the conductor set 257 may include a plurality of the coupling conductors 258. One end of the coupling conductor 258 is electrically connected to the connection conductor 251. The other end of the coupling conductor 258 is electrically connected to the inner conductor 254. The coupling conductor 258 may extend along the Z direction. At least a portion of the coupling conductor 258 may be located within the second surface 212 of the housing 10. The coupling conductor 258 may be a through hole conductor, a via conductor, or the like.

The conductor set 259 electrically connects the connection conductor 252 and the inner conductor 255. The conductor set 259 includes at least one coupling conductor 260. In the present embodiment, the conductor set 259 includes one coupling conductor 260. However, the conductor set 259 may include a plurality of coupling conductors 260. One end of the coupling conductor 260 is electrically connected to the connection conductor 252. The other end of the coupling conductor 260 is electrically connected to the inner conductor 255. The coupling conductor 260 may extend along the Z direction. At least a portion of the coupling conductor 260 may be located within the second surface 212 of the housing 210. The coupling conductor 260 may be a through hole conductor, a via conductor, or the like.

The conductor set 261 electrically connects the connection conductor 253 and the inner conductor 256. The conductor set 261 includes at least one coupling conductor 262. In the present embodiment, the conductor set 261 includes one coupling conductor 262. However, the conductor set 261 may include a plurality of coupling conductors 262. One end of the coupling conductor 262 is electrically connected to the connection conductor 253. The other end of the coupling conductor 262 is electrically connected to the inner conductor 256. The coupling conductor 262 may extend along the Z direction. At least a portion of the coupling conductor 262 may be located within the second surface 212 of the housing 210. The coupling conductor 262 may be a through hole conductor, a via conductor, or the like.

As illustrated in FIG. 10, the third conductor 263 faces the inner conductors 254 to 256. As with the third conductor 70 illustrated in FIG. 2, the third conductor 263 is located more to the negative Z-axis side than the inner conductors 254 to 256. The third conductor 263 capacitively couples the inner conductors 254 to 256. Capacitively coupling the inner conductors 254 to 256 with the third conductor 263 allows the capacitive coupling between the inner conductors 254 to 256 to be increased. The third conductor 263 may be roughly an equilateral triangle. The dielectric substrate 264 may be located between the third conductor 263 and the inner conductors 254 to 256. The dielectric material included in the dielectric substrate 264 can be the same as or different from the dielectric material included in the housing 210. The dielectric constant of the dielectric substrate 264 may be appropriately adjusted in consideration of the desired magnitude of the capacitive coupling between the inner conductors 254 to 256. The area of the third conductor 263 may be appropriately adjusted in consideration of the desired magnitude of the capacitive coupling between the inner conductors 254 to 256.

The power supply line 72 is electrically connected to any one portion of the second conductor group 250. In the present embodiment, the power supply line 72 is electrically connected to the third conductor 263 of the second conductor group 250.

As described above, in the wireless communication device 201 according to the third embodiment, even if there are no rows of resonator structures, the antenna 202 can emit electromagnetic waves without reduced emission efficiency. Also, as in the first embodiment, the antenna 202 according to the third embodiment is configured with the housing 210 of the wireless communication device 201. Configuring the antenna 202 with the housing 210 can reduce the number of components composing the antenna 202 in the wireless communication device 201. Thus, according to the present embodiment, the antenna 202, the wireless communication module 3, and the wireless communication device 201, which are novel, can be provided.

Other effects and configurations according to the third embodiment are the same as those of the first embodiment.

Fourth Embodiment

Figure 11:
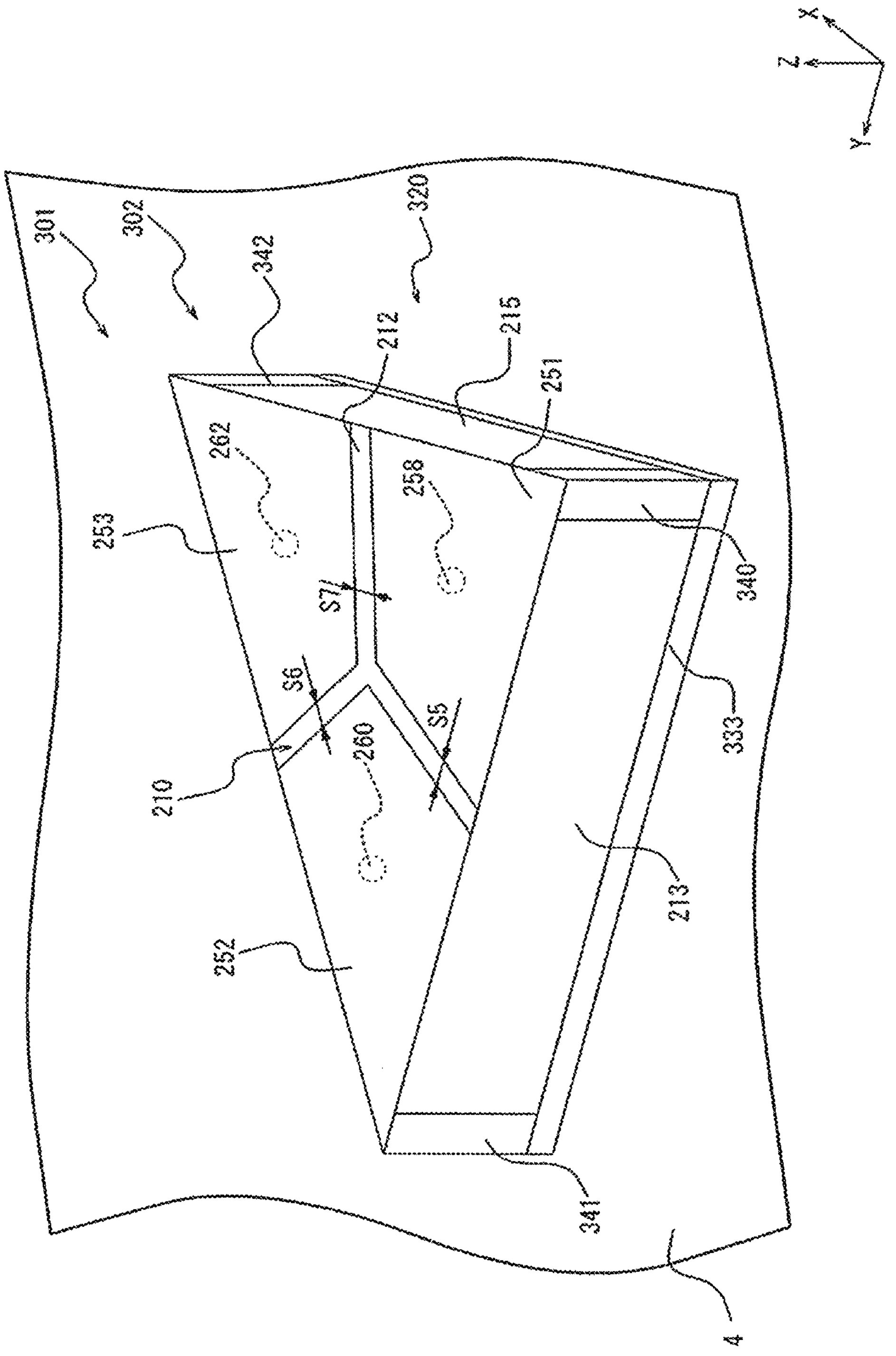
FIG. 11 is a perspective view of a wireless communication device according to a fourth embodiment of the present disclosure.
Figure 12:
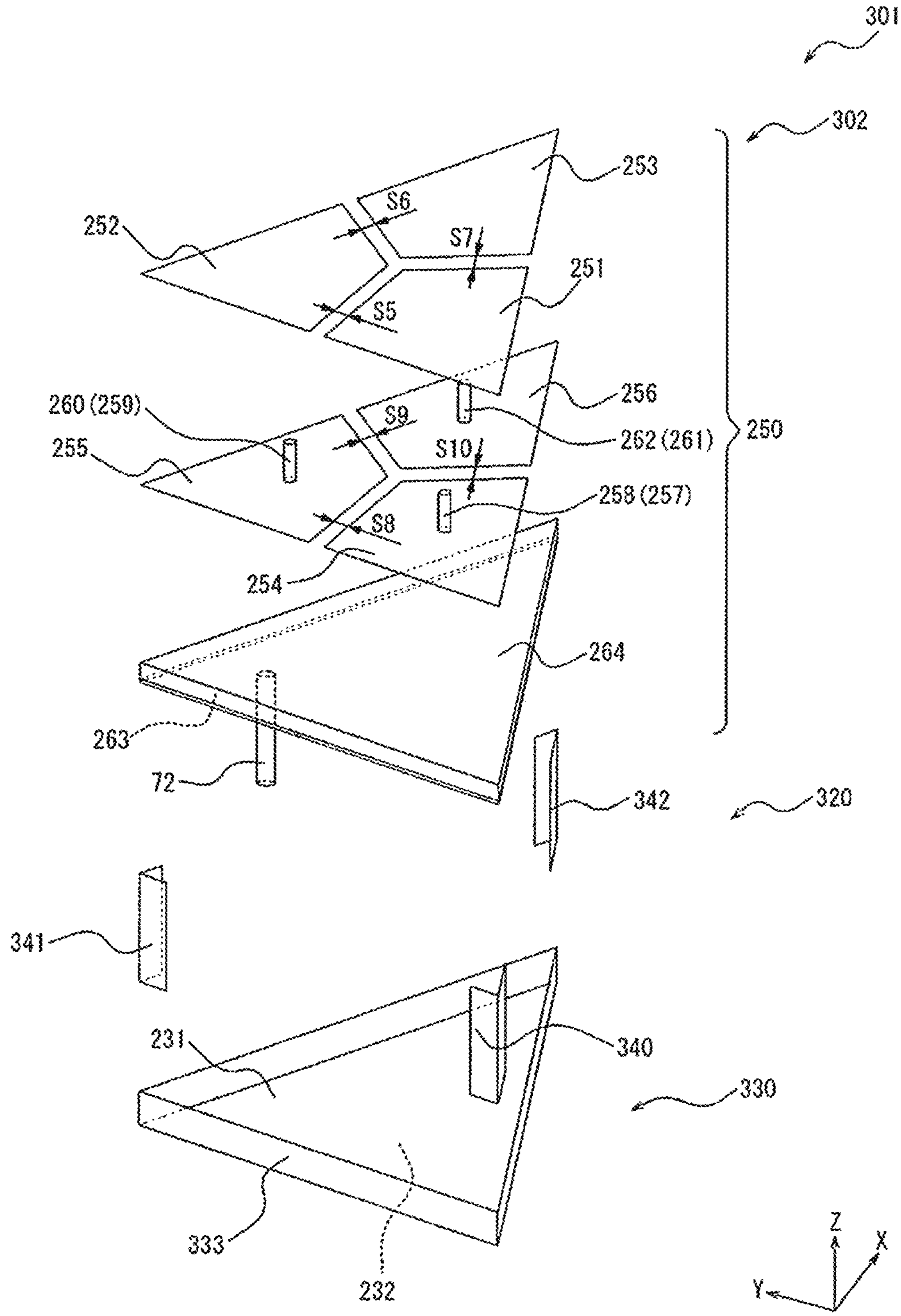
FIG. 12 is an exploded perspective view of a portion of the wireless communication device illustrated in FIG. 11.

FIG. 11 is a perspective view of a wireless communication device 301 according to the fourth embodiment of the present disclosure. FIG. 12 is an exploded perspective view of a portion of the wireless communication device 301 illustrated in FIG. 11. A main difference between the wireless communication device 301 according to the fourth embodiment and the wireless communication device 201 according to the third embodiment will be described below.

As illustrated in FIG. 11, the wireless communication device 301 includes an antenna 302. As illustrated in FIGS. 11 and 12, the antenna 302 includes the housing 210, a first conductor group 320, and the power supply line 72. As illustrated in FIG. 12, the first conductor group 320 includes a first conductor 330, second conductors 340, 341, 342, and the second conductor group 250.

As illustrated in FIG. 12, the first conductor 330 includes the upper surface 231, the lower surface 232, and a side surface 333. The side surface 333 continuously surrounds the periphery of first surface 211 of the housing 210 illustrated in FIG. 9.

Similar to the third embodiment, the second conductors 340 to 342 are located separated from one another. Similar to the third embodiment, the second conductors 340 to 342 are electrically connected to the first conductor 330. Similar to the third embodiment, each of the second conductors 340 to 342 extends from one of the first corners 211A to 211C of the housing 210 illustrated in FIG. 9 toward one of the second corners 212A to 212C.

The width of the second conductors 340 to 342 is less than the width of the second conductors 240 to 242 according to the third embodiment. The shape of the second conductors 340 to 342 is a pillar shape extending along the Z direction. Similar to the third embodiment, the periphery of the second conductor group 250 in the XY plane is surrounded by the second conductors 340 to 342. As viewed from the second conductor group 250, the set including the second conductors 340, 341 is seen as one electrical wall, the set including the second conductors 341, 342 is seen as one electrical wall, and the set including the second conductors 342, 340 is seen as one electrical wall. As the second conductor group 250 is surrounded by three electrical walls, the antenna 302 can emit circularly polarized waves, in a similar manner to the third embodiment. Also, the second conductor group 250 is surrounded by these three electrical walls. Thus, as in the third embodiment, the antenna 302 exhibits an artificial magnetic conductor character with respect to a predetermined frequency of electromagnetic waves incident on the XY plane of the wireless communication device 301 from the positive Z-axis side.

Other configurations and effects of the antenna 302 according to the fourth embodiment are the same as those of the antenna 202 according to the third embodiment.

Fifth Embodiment

Figure 13:
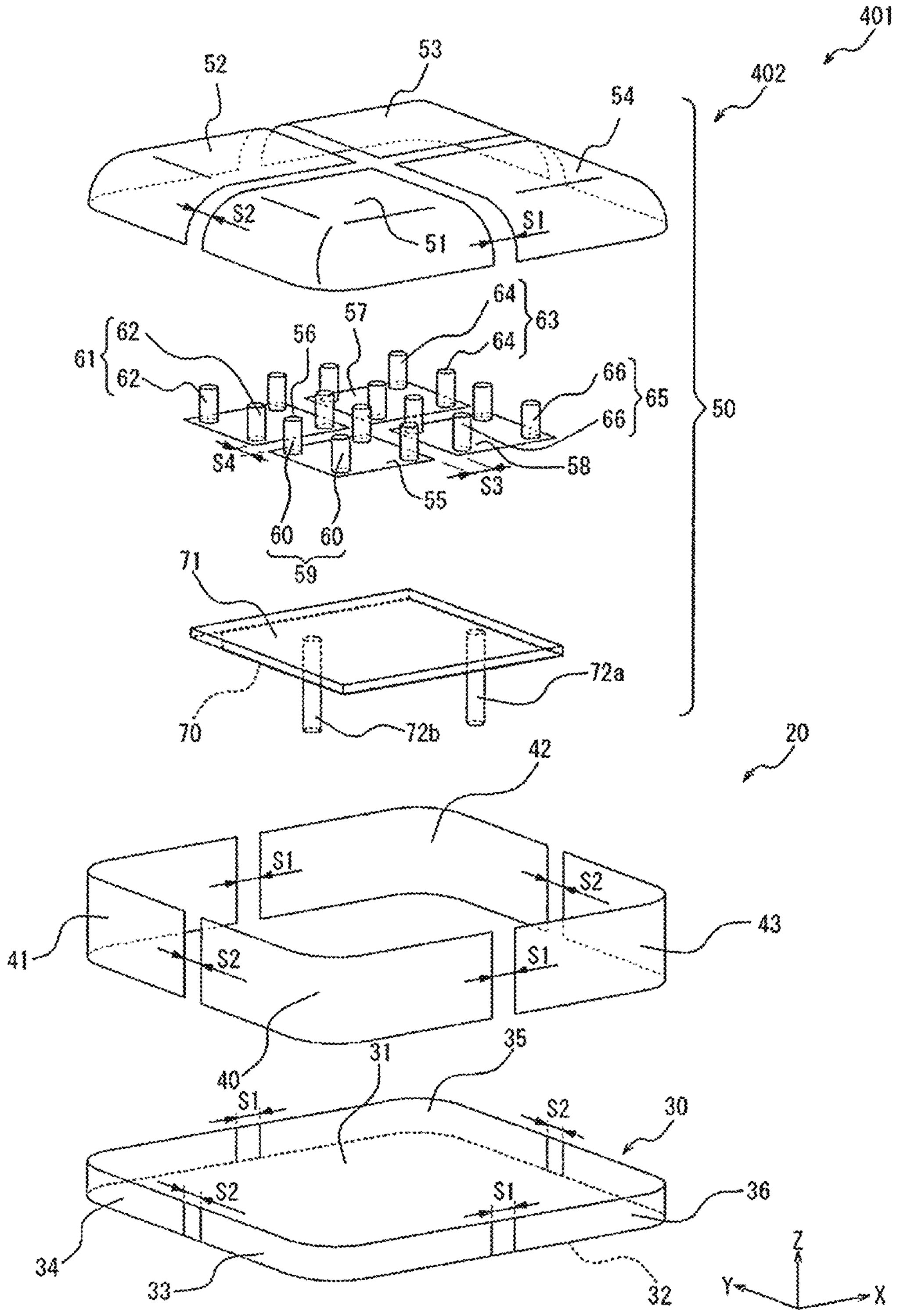
FIG. 13 is an exploded perspective view of a portion of a wireless communication device according to a fifth embodiment of the present disclosure.

FIG. 13 is an exploded perspective view of a portion of a wireless communication device 401 according to the fifth embodiment of the present disclosure. The shape of the wireless communication device 401 may be similar to the shape of the wireless communication device 1 illustrated in FIG. 1. The wireless communication device 401 includes an antenna 402. The wireless communication device 401 may include the circuit board 80 as illustrated in FIG. 2. Also, as illustrated in FIG. 5, the wireless communication device 401 includes the wireless communication module 3, the sensor 91, the battery 92, the memory 93, and the controller 94. The wireless communication module 3 of the wireless communication device 401 includes the antenna 402 and the RF module 90 as illustrated in FIG. 5.

The antenna 402 includes the first conductor group 20, a power supply line 72*a*, and a power supply line 72*b*. Similar to the antenna 2 illustrated in FIG. 1, the antenna 402 includes the housing 10 as illustrated in FIG. 1. The antenna 402 may include, instead of the first conductor group 20, the first conductor group 120 illustrated in FIG. 7.

The power supply line 72*a* and the power supply line 72*b* are electrically connected to any one portion of the second conductor group 50 of the first conductor group 20. The signal propagating in the power supply line 72*a* and the signal propagating in the power supply line 72*b* correspond to differential signals. In the present embodiment, one end of the power supply line 72*a* and one end of the power supply line 72*b* are connected to the third conductor 70 of the second conductor group 50. The power supply line 72*a* and the power supply line 72*b* may be connected to positions at different portions of the third conductor 70. The other end of the power supply line 72*a* and the other end of the power supply line 72*b* are electrically connected to the RF module 90 of the wireless communication device 401. The power supply line 72*a* and the power supply line 72*b* are located within the housing portion 17 of the housing 10 as illustrated in FIG. 2. The power supply line 72 may extend along the Z direction. The power supply line 72*a* and the power supply line 72*b* may be a through hole conductor, a via conductor, or the like. The antenna 402 is capable of emitting circularly polarized waves as in the first embodiment. The third conductor 70 may include, at a portion, a cutout, projection, or the like that perturbs two orthogonal modes that make up the circularly polarized waves. If this perturbation is not provided, the waves become linearly polarized.

Other configurations and effects of the antenna 402 according to the fifth embodiment are the same as those of the antenna 2 according to the first embodiment.

The configurations according to the present disclosure are not limited only to the embodiments described above, and some variations or changes can be made. For example, the functions and the like included in each of the components and the like can be rearranged as long as logically inconsistencies are avoided, and multiple components can be combined into one or divided.

For example, the above-described shape of the wireless communication device 1, 101 is roughly a square prism. However, the shape of the wireless communication device 1, 101 is not limited to being roughly a square prism. For example, the shape of the wireless communication device 1, 101 can be roughly circular. For example, the shape of the wireless communication device 1, 101 can be roughly rectangular. For example, with a configuration in which the shape of the wireless communication device 1 is roughly rectangular, the antenna 2 can emit at least one of electromagnetic waves at a frequency corresponding to the length of the long sides of the rectangular parallelepiped or electromagnetic waves at a frequency corresponding to the length of the short sides of the rectangular parallelepiped.

For example, the wireless communication device 1, 101, 201, 301 described above includes the battery 92. However, the wireless communication device 1, 101, 201, 301 need not include the battery 92. In this case, the wireless communication device 1, 101, 201, 301 may include an energy harvesting device. Examples of an energy harvesting device include a type that converts sunlight into electrical power, a type that converts vibration into electrical power, a type that converts heat into electrical power, and the like.

The drawings for describing the configuration according to the present disclosure are schematic. The dimensional proportions and the like in the drawings do not necessarily coincide with the actual values.

In the present disclosure, "first", "second", "third", and the like are examples of identifiers for distinguishing the configurations. Configurations distinguished in the description by "first", "second", and the like in the present disclosure are interchangeable in terms of the number of the configuration. For example, the first conductor can exchange the identifiers, "first" and "second" with the second conductor. The identifiers are interchanged simultaneously. The configurations are distinguished after the identifiers are interchanged. The identifiers may be deleted. Configurations with deleted identifiers are distinguished by reference signs. No interpretation of the order of the configurations, no grounds for the presence of an identifier of a lower value, and no grounds for the presence of an identifier of a higher value shall be given based solely on the description of identifiers such as "first" and "second" in the present disclosure.

REFERENCE SIGNS LIST

1, 101, 201, 301, 401 Wireless communication device
2, 102, 202, 302, 402 Antenna

3 Wireless communication module
4 Metal plate
10, 210 Housing
11, 211 First surface
11A, 11B, 11C, 11D, 211A, 211B, 211C First corner portion
12, 212 Second surface
12A, 12B, 12C, 12D, 212A, 212B, 212C Second corner portion
13, 14, 15, 16, 213, 214, 215 Side surface
17, 217 Housing portion
20, 120, 220, 320 First conductor group
30, 130, 230, 330 First conductor
31, 231 Upper surface
32, 232 Lower surface
33, 34, 35, 36, 133, 233, 234, 235, 333 Side surface
40, 41, 42, 43, 140, 141, 142, 143, 240, 241, 242, 340, 341, 342 Second conductor
50, 250 Second conductor group
51, 52, 53, 54, 251, 252, 253 Connection conductor
55, 56, 57, 58, 254, 255, 256 Inner conductor
59, 61, 63, 65, 257, 259, 261 Conductor set
60, 62, 64, 66, 258, 260, 262 Coupling conductor
70, 263 Third conductor
71, 264 Dielectric substrate
72, 72*a*, 72*b* Power supply line
80 Circuit board
81 Insulation substrate
82, 83 Conductor layer
90 RF module
91 Sensor
92 Battery
93 Memory
94 Controller

The invention claimed is:

1. An antenna, comprising:
a housing made of a resin;
a first conductor group; and
a power supply line, wherein
the housing comprises
a first surface comprising at least three first corner portions,
a second surface comprising at least three second corner portions, the second surface facing the first surface,
a side surface connecting the first surface and the second surface, and
a housing portion surrounded by the first surface, the second surface, and the side surface,
the first conductor group comprises
a first conductor extending along the first surface,
at least three second conductors separated from one another and extending along the side surface from the first corner portions toward the second corner portions, the at least three second conductors being electrically connected to the first conductor, and
a second conductor group extending along the second surface, the second conductor group capacitively coupling the at least three second conductors, and
the power supply line is connected to any one portion of the second conductor group.

2. The antenna according to claim 1, wherein
the second conductor group comprises
at least three connection conductors separated from one another and extending along the second surface, the at least three connection conductors being electrically connected to the at least three second conductors,
at least three inner conductors located closer to the housing portion than the at least three connection conductors, and
at least three conductor sets electrically connecting the at least three connection conductors and the at least three inner conductors.

3. The antenna according to claim 2, further comprising
a capacitor connected between the at least three inner conductors.

4. The antenna according to claim 2, wherein
the second conductor group further comprises a third conductor capacitively coupling the at least three inner conductors.

5. The antenna according to claim 2, wherein
the conductor set comprises a plurality of coupling conductors located separated from one another.

6. The antenna according to claim 2, wherein
the first surface comprises four first corner portions as the at least three first corner portions,
the second surface comprises four second corner portions as the at least three second corner portions,
the first conductor group comprises four second conductors as the at least three second conductors; and
the second conductor group comprises four connection conductors as the at least three connection conductors, the four connection conductors being separated from one another in a first direction and a second direction that intersects the first direction.

7. The antenna according to claim 6, wherein
the second conductor has a pillar shape extending in a third direction that intersects the first direction and the second direction.

8. A wireless communication module, comprising:
the antenna according to claim 7; and
an RF module located within the housing portion.

9. A wireless communication device, comprising:
the wireless communication module according to claim 8; and
a sensor located within the housing portion.

* * * * *